US007477409B2

(12) United States Patent
Yamamura

(10) Patent No.: US 7,477,409 B2
(45) Date of Patent: Jan. 13, 2009

(54) INFORMATION PROCESSING APPARATUS, CONTROL METHOD THEREOF, AND COMPUTER-READABLE MEDIUM

(75) Inventor: Shinichi Yamamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1082 days.

(21) Appl. No.: 10/690,515

(22) Filed: Oct. 23, 2003

(65) Prior Publication Data
US 2004/0085583 A1 May 6, 2004

(30) Foreign Application Priority Data
Oct. 30, 2002 (JP) ............................. 2002-316402
Oct. 15, 2003 (JP) ............................. 2003-355387

(51) Int. Cl.
*G06F 3/12* (2006.01)
*G06K 15/00* (2006.01)
(52) U.S. Cl. ..................... 358/1.15; 358/1.13; 358/1.18
(58) Field of Classification Search ............... 358/1.15, 358/1.13, 1.14, 1.1, 1.18, 1.2, 1.9, 1.11, 1.16, 358/1.17, 500, 501, 400, 401, 407, 468; 399/1, 399/8, 16, 82, 364, 361, 363; 347/2, 3, 5, 347/14, 23
See application file for complete search history.

(56) References Cited

U.S. PATENT DOCUMENTS

| 4,313,673 | A | * | 2/1982 | Wartinger et al. | ............ 399/364 |
| 4,961,092 | A | * | 10/1990 | Rabb et al. | .................. 399/403 |
| 6,690,911 | B2 | * | 2/2004 | Yamagishi | .................. 399/405 |
| 2002/0180822 | A1 | | 12/2002 | Aritomi | ........................ 347/19 |
| 2003/0189718 | A1 | | 10/2003 | Yamamura | ................. 358/1.13 |
| 2004/0085386 | A1 | | 5/2004 | Yamamura | .................... 347/19 |

* cited by examiner

*Primary Examiner*—Dov Popovici
(74) *Attorney, Agent, or Firm*—Fitzpatrick, Cella, Harper & Scinto

(57) ABSTRACT

A print process of body text and a 2-sided print process of tab paper sheets are done by a single operation from a PC. Body text data and one face of each tab paper sheet undergo a print process, only tab paper sheets are set in a tray again, and a print instruction is issued to execute a print process of only the other face of each tab paper sheet. Alternatively, after only one face of each tab paper sheet undergoes a print process, a print process of the other face of each tab paper sheet is executed together with body text data. In this case, an information processing apparatus issues commands and data required to execute the print process on the printing apparatus side.

7 Claims, 24 Drawing Sheets

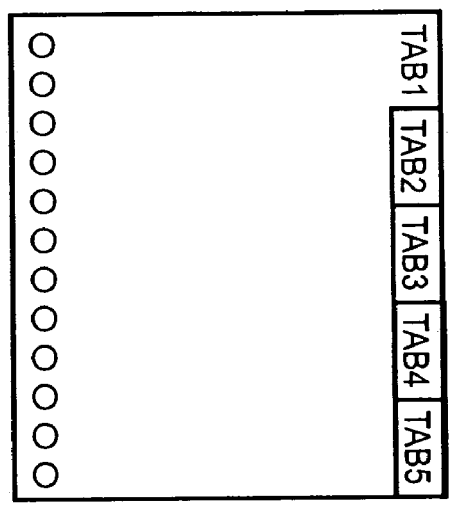
F I G. 4A
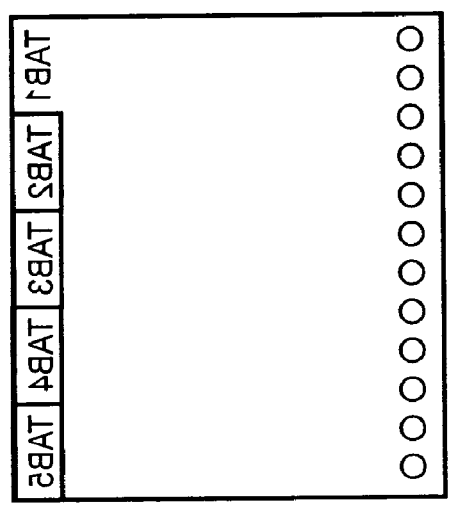
F I G. 4B
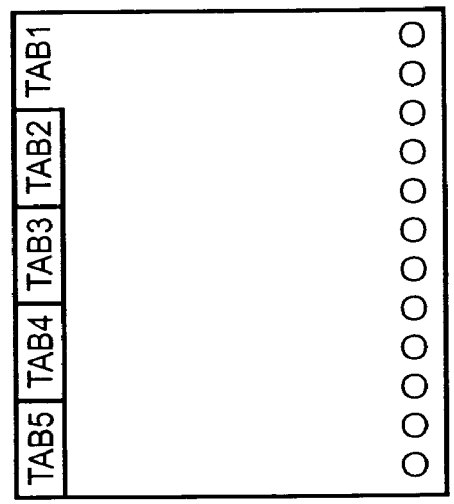
F I G. 4C

FIG. 9

| | |
|---|---|
| TOTAL NUMBER OF PHYSICAL PAGES | ~901 |
| TOTAL NUMBER OF LOGICAL PAGES | ~902 |
| NUMBER OF SETS OF COPIES | ~903 |
| COPY SET PRINT | ~904 |
| FINISHING INFORMATION | ~905 |
| ADDITIONAL PRINT INFORMATION | ~906 |

FIG. 17

| | |
|---|---|
| Job Start | ~1701 |
| PAPER OUTPUT COMMAND THAT DESIGNATES TRAY B | ~1702 |
| PAPER SOURCE COMMAND THAT DESIGNATES PAPER SOURCE OF NORMAL PAPER | ~1703 |
| MEDIA COMMAND THAT DESIGNATES NORMAL PAPER | ~1704 |
| FIRST PAGE (BODY TEXT) | ~1705 |
| SECOND PAGE (BODY TEXT) | ~1706 |
| PAPER OUTPUT COMMAND THAT DESIGNATES TRAY A | ~1707 |
| PAPER SOURCE COMMAND THAT DESIGNATES PAPER SOURCE OF TAB PAPER | ~1708 |
| MEDIA COMMAND THAT DESIGNATES TAB PAPER | ~1709 |
| TAB PAPER (THIRD PAGE, OBVERSE FACE) | ~1710 |
| PAPER OUTPUT COMMAND THAT DESIGNATES TRAY B | ~1711 |
| PAPER SOURCE COMMAND THAT DESIGNATES PAPER SOURCE OF NORMAL PAPER | ~1712 |
| MEDIA COMMAND THAT DESIGNATES NORMAL PAPER | ~1713 |
| FOURTH PAGE (BODY TEXT) | ~1714 |
| FIFTH PAGE (BODY TEXT) | ~1715 |
| PAPER OUTPUT COMMAND THAT DESIGNATES TRAY A | ~1716 |
| PAPER SOURCE COMMAND THAT DESIGNATES PAPER SOURCE OF TAB PAPER | ~1717 |
| MEDIA COMMAND THAT DESIGNATES TAB PAPER | ~1718 |
| TAB PAPER (SIXTH PAGE, OBVERSE FACE) | ~1719 |
| PJL COMMAND THAT PAUSES PRINT UNTIL INSTRUCTION COMES FROM USER INTERFACE OF PRINTER 1500 | ~1720 |
| PAPER OUTPUT COMMAND THAT DESIGNATES TRAY B | ~1721 |
| PAPER SOURCE COMMAND THAT DESIGNATES PAPER SOURCE OF TAB PAPER | ~1722 |
| MEDIA COMMAND THAT DESIGNATES TAB PAPER | ~1723 |
| TAB PAPER (THIRD PAGE, REVERSE FACE) | ~1724 |
| TAB PAPER (SIXTH PAGE, REVERSE FACE) | ~1725 |
| Job End | ~1726 |

FIG. 18

| | |
|---|---|
| Job Start | 1801 |
| PAPER OUTPUT COMMAND THAT DESIGNATES TRAY B | 1802 |
| PAPER SOURCE COMMAND THAT DESIGNATES PAPER SOURCE OF NORMAL PAPER | 1803 |
| MEDIA COMMAND THAT DESIGNATES NORMAL PAPER | 1804 |
| FIRST PAGE (BODY TEXT) | 1805 |
| SECOND PAGE (BODY TEXT) | 1806 |
| THIRD PAGE (BODY TEXT) | 1807 |
| BLANK PAGE NON-BILLING COMMAND | 1808 |
| PAPER OUTPUT COMMAND THAT DESIGNATES TRAY A | 1809 |
| PAPER SOURCE COMMAND THAT DESIGNATES PAPER SOURCE OF TAB PAPER | 1810 |
| MEDIA COMMAND THAT DESIGNATES TAB PAPER | 1811 |
| TAB PAPER (FOURTH PAGE, OBVERSE FACE) | 1812 |
| PAPER OUTPUT COMMAND THAT DESIGNATES TRAY B | 1813 |
| PAPER SOURCE COMMAND THAT DESIGNATES PAPER SOURCE OF NORMAL PAPER | 1814 |
| MEDIA COMMAND THAT DESIGNATES NORMAL PAPER | 1815 |
| FIFTH PAGE (BODY TEXT) | 1816 |
| SIXTH PAGE (BODY TEXT) | 1817 |
| SEVENTH PAGE (BODY TEXT) | 1818 |
| BLANK PAGE NON-BILLING COMMAND | 1819 |
| PAPER OUTPUT COMMAND THAT DESIGNATES TRAY A | 1820 |
| PAPER SOURCE COMMAND THAT DESIGNATES PAPER SOURCE OF TAB PAPER | 1821 |
| MEDIA COMMAND THAT DESIGNATES TAB PAPER | 1822 |
| TAB PAPER (EIGHTH PAGE, OBVERSE FACE) | 1823 |
| PJL COMMAND THAT PAUSES PRINT UNTIL INSTRUCTION COMES FROM USER INTERFACE OF PRINTER 1500 | 1824 |
| PAPER OUTPUT COMMAND THAT DESIGNATES TRAY B | 1825 |
| PAPER SOURCE COMMAND THAT DESIGNATES PAPER SOURCE OF TAB PAPER | 1826 |
| MEDIA COMMAND THAT DESIGNATES TAB PAPER | 1827 |
| TAB PAPER (FOURTH PAGE, REVERSE FACE) | 1828 |
| TAB PAPER (EIGHTH PAGE, REVERSE FACE) | 1829 |
| Job End | 1830 |

FIG. 19

| | |
|---|---|
| Job Start | ~ 1901 |
| PAPER OUTPUT COMMAND THAT DESIGNATES TRAY B | ~ 1902 |
| PAPER SOURCE COMMAND THAT DESIGNATES PAPER SOURCE OF NORMAL PAPER | ~ 1903 |
| MEDIA COMMAND THAT DESIGNATES NORMAL PAPER | ~ 1904 |
| 2-SIDED PRINT COMMAND | ~ 1905 |
| FIRST PAGE (BODY TEXT) | ~ 1906 |
| SECOND PAGE (BODY TEXT) | ~ 1907 |
| 1-SIDED PRINT COMMAND | ~ 1908 |
| THIRD PAGE (BODY TEXT) | ~ 1909 |
| PAPER OUTPUT COMMAND THAT DESIGNATES TRAY A | ~ 1910 |
| PAPER SOURCE COMMAND THAT DESIGNATES PAPER SOURCE OF TAB PAPER | ~ 1911 |
| MEDIA COMMAND THAT DESIGNATES TAB PAPER | ~ 1912 |
| TAB PAPER (FOURTH PAGE, OBVERSE FACE) | ~ 1913 |
| PAPER OUTPUT COMMAND THAT DESIGNATES TRAY B | ~ 1914 |
| PAPER SOURCE COMMAND THAT DESIGNATES PAPER SOURCE OF NORMAL PAPER | ~ 1915 |
| MEDIA COMMAND THAT DESIGNATES NORMAL PAPER | ~ 1916 |
| 2-SIDED PRINT COMMAND | ~ 1917 |
| FIFTH PAGE (BODY TEXT) | ~ 1918 |
| SIXTH PAGE (BODY TEXT) | ~ 1919 |
| 1-SIDED PRINT COMMAND | ~ 1920 |
| SEVENTH PAGE (BODY TEXT) | ~ 1921 |
| PAPER OUTPUT COMMAND THAT DESIGNATES TRAY A | ~ 1922 |
| PAPER SOURCE COMMAND THAT DESIGNATES PAPER SOURCE OF TAB PAPER | ~ 1923 |
| MEDIA COMMAND THAT DESIGNATES TAB PAPER | ~ 1924 |
| TAB PAPER (EIGHTH PAGE, OBVERSE FACE) | ~ 1925 |
| PJL COMMAND THAT PAUSES PRINT UNTIL INSTRUCTION COMES FROM USER INTERFACE OF PRINTER 1500 | ~ 1926 |
| PAPER OUTPUT COMMAND THAT DESIGNATES TRAY B | ~ 1927 |
| PAPER SOURCE COMMAND THAT DESIGNATES PAPER SOURCE OF TAB PAPER | ~ 1928 |
| MEDIA COMMAND THAT DESIGNATES TAB PAPER | ~ 1929 |
| TAB PAPER (FOURTH PAGE, REVERSE FACE) | ~ 1930 |
| TAB PAPER (EIGHTH PAGE, REVERSE FACE) | ~ 1931 |
| Job End | ~ 1932 |

FIG. 24

| | |
|---|---|
| Job Start | 2401 |
| FIRST PAGE (TAB PAPER) – OBVERSE FACE PRINT PAPER OUTPUT DESIGNATION COMMAND (TRAY A) | 2402 |
| SECOND PAGE (TAB PAPER) – OBVERSE FACE PRINT PAPER OUTPUT DESIGNATION COMMAND (TRAY A) | 2403 |
| THIRD PAGE (TAB PAPER) – OBVERSE FACE PRINT PAPER OUTPUT DESIGNATION COMMAND (TRAY A) | 2404 |
| ISSUE COMMAND THAT DISPLAYS WARNING MESSAGE ON USER INTERFACE, AND PAUSE JOB UNTIL DEPRESSION OF OK BUTTON IS ACCEPTED | 2405 |
| THIRD PAGE (TAB PAPER) – REVERSE FACE PRINT PAPER OUTPUT DESIGNATION COMMAND (TRAY B) | 2406 |
| SECOND PAGE (TAB PAPER) – REVERSE FACE PRINT PAPER OUTPUT DESIGNATION COMMAND (TRAY B) | 2407 |
| FIRST PAGE (TAB PAPER) – REVERSE FACE PRINT PAPER OUTPUT DESIGNATION COMMAND (TRAY B) | 2408 |
| Job End | 2409 |

US 7,477,409 B2

INFORMATION PROCESSING APPARATUS, CONTROL METHOD THEREOF, AND COMPUTER-READABLE MEDIUM

FIELD OF THE INVENTION

The present invention relates to a printing apparatus and information processing apparatus, a control method thereof, a program, and a storage medium and, more particularly, to tab generation and print control processes in a system which includes an information processing apparatus such as a personal computer or the like, and a printer.

BACKGROUND OF THE INVENTION

A tab paper sheet is a paper sheet with a "tab" indicating an item or title to an A4 or letter paper sheet, and so-called "10-tab style" sheets with 10 tabs, "5-tab style" sheets with five tabs, and the like are prevalent. The standard size of a tab portion is ½" in case of the letter size, but some tab paper sheets have tabs of other sizes. FIG. 4A shows an example of a "5-tab style" sheet.

Compared to a normal paper sheet, since a tab is attached and a tab paper sheet is normally formed of a paperboard and often causes paper jam at a convey system in a conventional printing apparatus, most of the conventional printing apparatuses do not support a print function on tab paper sheets. However, in recent years, since the technology of sheet convey systems has improved, a printing apparatus can perform a tab paper print process. Accordingly, a printing apparatus called a multi-function machine having a printer function and the like can print a tab generated on a computer via a printer driver.

However, a printing apparatus can only perform a 1-sided print process on tab paper sheets, but cannot normally perform a 2-sided print process due to its convey system. Since the tab paper sheet is made up of a paperboard, it is technically very difficult to reverse the sheet in the 2-sided print process.

Since items or titles to be printed on the tabs of tab paper sheets represent the contents of documents divided by these sheets, it is very important that they can be confirmed from the reverse face side, i.e., they are printed on the reverse faces.

In order to conquer such physical limitation (i.e., a paperboard cannot be reversed) of the printing apparatus, the following method may be adopted. That is, a tab paper sheet with a tab, one face of which has undergone a print process, is removed from printouts output onto an exhaust tray, and is manually reversed. Then, the reversed tab paper sheet is set on a sheet feed tray or manual insert tray to print only on the reverse face of the tab paper sheet.

However, with this method, (1) the user issues a print instruction from an information processing apparatus such as a host computer or the like to print on only one face of each sheet. (2) The user goes to the location of a printing apparatus, removes only tab paper sheets from an exhaust tray, and sets them in a cassette or manual insert tray. (3) The user then issues a print instruction of only tab paper sheets again from the information processing apparatus. Hence, the user must come and go at least twice between the host computer and printing apparatus. Such method not only wastes time but also readily causes operation miscues since user's actions increase.

SUMMARY OF THE INVENTION

A printing apparatus executes a print process of body text and a 2-sided print process of tab paper sheets by a single operation at an information processing apparatus. The print process for one face of each tab paper sheet is executed together with body text, only tab paper sheets are set on a tray again, and a print instruction is issued to execute the print process for the other face of each tab paper sheet. Alternatively, after the print process for only one face of each tab paper sheet is executed, that for the other face of each tab paper sheet is executed together with body text. In this case, the information processing apparatus issues commands and data required for the printing apparatus to execute such print processes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4A shows an example of a tab paper sheet according to the embodiment of the present invention;

FIG. 4B shows an example of the obverse face of a tab paper sheet according to the embodiment of the present invention;

FIG. 4C shows an example of the reverse face of a tab paper sheet according to the embodiment of the present invention;

FIG. 9 shows an example of the data format to be passed upon issuing a print request of physical pages from the spool file manager 304 to the despooler 305 according to the embodiment of the present invention;

FIG. 17 is a table for explaining a 2-sided print method of tab paper sheets according to the first embodiment of the present invention at command level;

FIG. 18 is a table for explaining a first print method according to the second embodiment of the present invention at command level;

FIG. 19 is a table for explaining a second print method according to the second embodiment of the present invention at command level;

FIG. 24 is a table for explaining the 2-sided print method of only tab paper sheets according to the fourth embodiment of the present invention at command level.

DETAILED DESCRIPTION OF THE PREFERRED EMBODIMENTS

Preferred embodiments of the present invention will now be described in detail in accordance with the accompanying drawings.

<Arrangement of Printer Control System>

Figure 1:
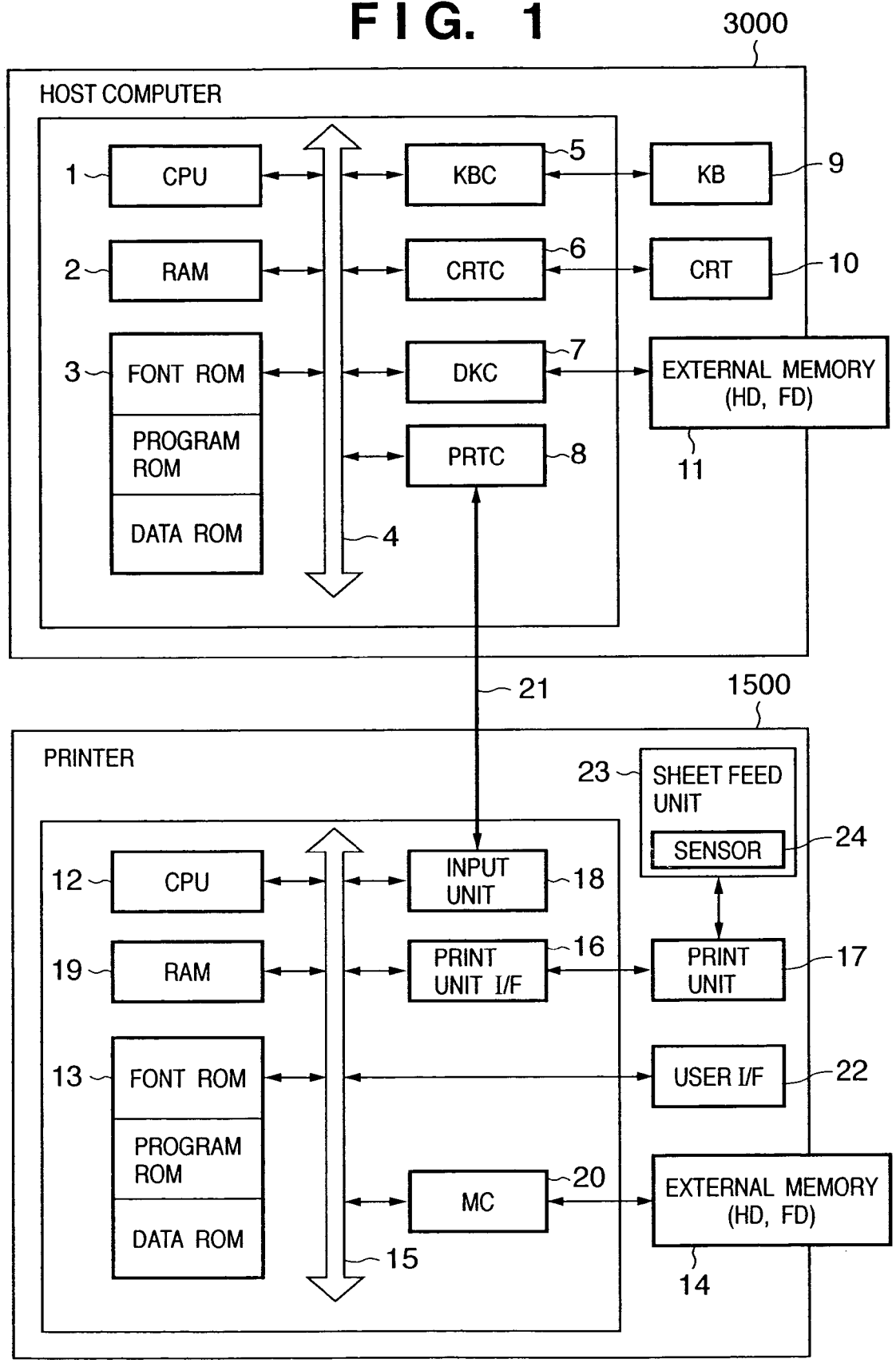
FIG. 1 is a block diagram for explaining the arrangement of a print system according to an embodiment of the present invention.

FIG. 1 is a block diagram for explaining the arrangement of a host computer and printer in a printer control system (print system) according to an embodiment of the present invention. Note that the present invention can be applied to any of a standalone apparatus, a system consisting of a plurality of apparatuses, and a system in which apparatuses are connected via a network such as a LAN, WAN, or the like to execute processes, as long as the functions of the present invention can be implemented.

Referring to FIG. 1, a host computer 3000 as an information processing apparatus comprises a CPU 1 which executes a document process including graphic data, image data, text data, and table data (including spreadsheet data or the like) together on the basis of a document processing program stored in a program ROM of a ROM 3 or an external memory 11. The CPU 1 systematically controls devices connected to a system bus 4.

The program ROM of the ROM 3 or the external memory 11 stores an operating system program (to be referred to as an OS hereinafter) and the like as a control program of the CPU 1. A font ROM of the ROM 3 or the external memory 11 stores font data and the like used in the document process. A data ROM of the ROM 3 or the external memory 11 stores various data used upon executing the document process and the like. A RAM 2 serves as a main memory, work area, and the like of the CPU 1.

A keyboard controller (KBC) 5 controls key inputs from a keyboard 9 and a pointing device (not shown). A CRT controller (CRTC) 6 controls display on a CRT display (CRT) 10. A disk controller (DKC) 7 controls access to the external memory 11 such as a hard disk (HD), floppy® disk (FD), and the like, which stores a boot program, various applications, font data, user files, edit files, a printer control command generation program (to be referred to as a printer driver hereinafter), and the like. A printer controller (PRTC) 8 is connected to a printer 1500 via a two-way interface (interface) 21, and executes a communication control process with the printer 1500.

Note that the CPU 1 executes an outline font rasterize process onto a display information RAM assured on, e.g., the RAM 2, thus allowing WYSIWYG on the CRT 10. Also, the CPU 1 opens various registered windows on the basis of commands designated by a mouse cursor (not shown) or the like on the CRT 10, and executes various data processes.

Upon executing a print process, the user opens a window that pertains to print setups, and can make setups of a print process method for the printer driver, which includes printer setups and print mode selection.

In FIG. 1, the printer 1500 is a printing apparatus which is controlled by a CPU 12. The CPU 12 outputs an image signal as output information to a print unit (printer engine) 17 connected to a system bus 15 on the basis of a control program and the like stored in a program ROM of a ROM 13 or a control program and the like stored in an external memory 14.

The program ROM of the ROM 13 stores a control program and the like of the CPU 12. A font ROM of the ROM 13 stores font data and the like used upon generating the output information. A data ROM of the ROM 13 stores information and the like used on the host computer in case of a printer which does not have any external memory 14 such as a hard disk or the like.

The CPU 12 can execute a communication process with the host computer via an input unit 18, and can inform the host computer 3000 of information in the printer and the like. A RAM 19 serves as a main memory, work area, and the like of the CPU 12, and its memory size can be expanded by an option RAM connected to an expansion port (not shown). Note that the RAM 19 is used as an output information rasterize area, environment data storage area, NVRAM, and the like.

A memory controller (MC) 20 controls access to the external memory 14 such as a hard disk (HD), IC card, or the like. The external memory 14 is connected as an option, and stores font data, an emulation program, form data, and the like. Reference numeral 22 denotes a user interface on which a display screen used to display a warning message (to be described later) (this display screen may be of touch panel type), switches for various operations, an OK button used to issue a print command to the printer, an online button which indicates whether or not the printer 1500 is in the online state and is used to switch the printer 1500 between the on and offline states, LED indicators, and the like are arranged.

The number of external memories 14 is not limited to one, and a plurality of external memories 14 may be connected. That is, option cards and external memories that store programs used to interpret printer control languages of different language systems in addition to internal font data may be connected. Furthermore, an NVRAM (not shown) may be connected, and may store printer mode setup information from the user interface 22.

A print unit 17 performs a print process based on an electrophotography method or ink-jet method. In case of the electrophotography method, the print unit 17 mainly comprises a photosensitive drum as an image carrier, a charging roller for uniformly charging the surface of the photosensitive drum to a predetermined polarity and potential, an image information exposure unit such as a laser beam scanner or the like for forming an electrostatic latent image by scanning and exposing the uniformly charged surface of the photosensitive drum, a developing unit for developing the electrostatic latent image on the photosensitive drum as a toner image, a transfer roller for sequentially and electrostatically transferring the toner image formed on the photosensitive drum onto a print sheet fed from a sheet feed unit 23, a fixing unit for fixing the toner image on the print sheet, an exhaust unit for exhausting the print sheet on which the toner image is fixed, and the like.

The sheet feed unit 23 comprises a plurality of paper sources including a manual insert tray, cassettes, and the like, as storage units that store print sheets including tab paper sheets. Each sheet feed stage comprises a sensor 24 for detecting the presence/absence of print sheets.

Figure 2:
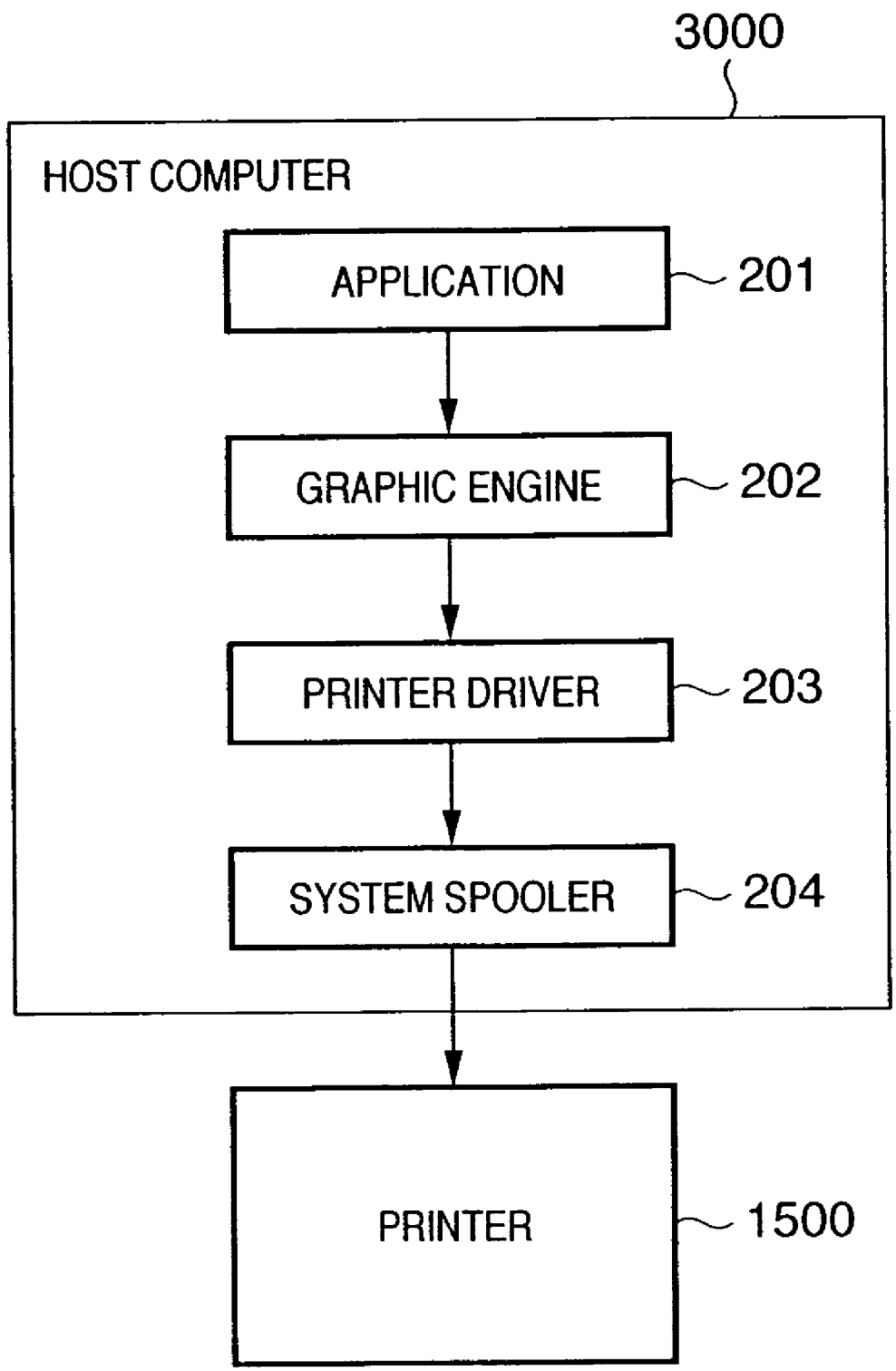
FIG. 2 is a diagram showing an example of the software module configuration required to implement a print process in a host computer 3000 according to the embodiment of the present invention.

FIG. 2 is a diagram showing an example of the software module configuration required to implement a typical print process in a host computer to which a printing apparatus such as a printer or the like is connected directly or via a network. An application 201, graphic engine 202, printer driver 203, and system spooler 204 are program modules, which are present as files saved in the external memory 11, and are loaded onto the RAM 2 by the OS or other modules that exploit those modules when they are executed. The application 201 and printer driver 203 can be added to the HD of the external memory 11 via the FD of the external memory 11, a CD-ROM (not shown), or a network (not shown).

The application 201 saved in the external memory 11 is loaded onto the RAM 2 upon execution. When this application 201 issues a print command to the printer 1500, an output (drawing) process is executed using the graphic engine 202 which is similarly loaded onto the RAM 2 and is ready to execute.

The graphic engine 202 loads the printer driver 203 prepared for each printing apparatus from the external memory 11 onto the RAM 2, and sets an output from the application 201 in the printer driver 203. The graphic engine 202 converts a GDI (Graphic Device Interface) function received from the application 201 into a DDI (Device Driver Interface) function, and outputs the DDI function to the printer driver 203.

The printer driver 203 converts the DDI function received from the graphic engine 202 into a control command that the printer can interpret, e.g., PDL (Page Description Language) data. The converted printer control command is output as print data to the printer 1500 via the system spooler 204 loaded onto the RAM 2 by the OS and the interface 21.

The print system of this embodiment further has an arrangement for temporarily spooling print data from the application as intermediate code data, as shown in FIG. 2, in addition to the print system which comprises the printer and host computer shown in FIG. 1.

<Print-related Software Module in this Embodiment>

Figure 3:
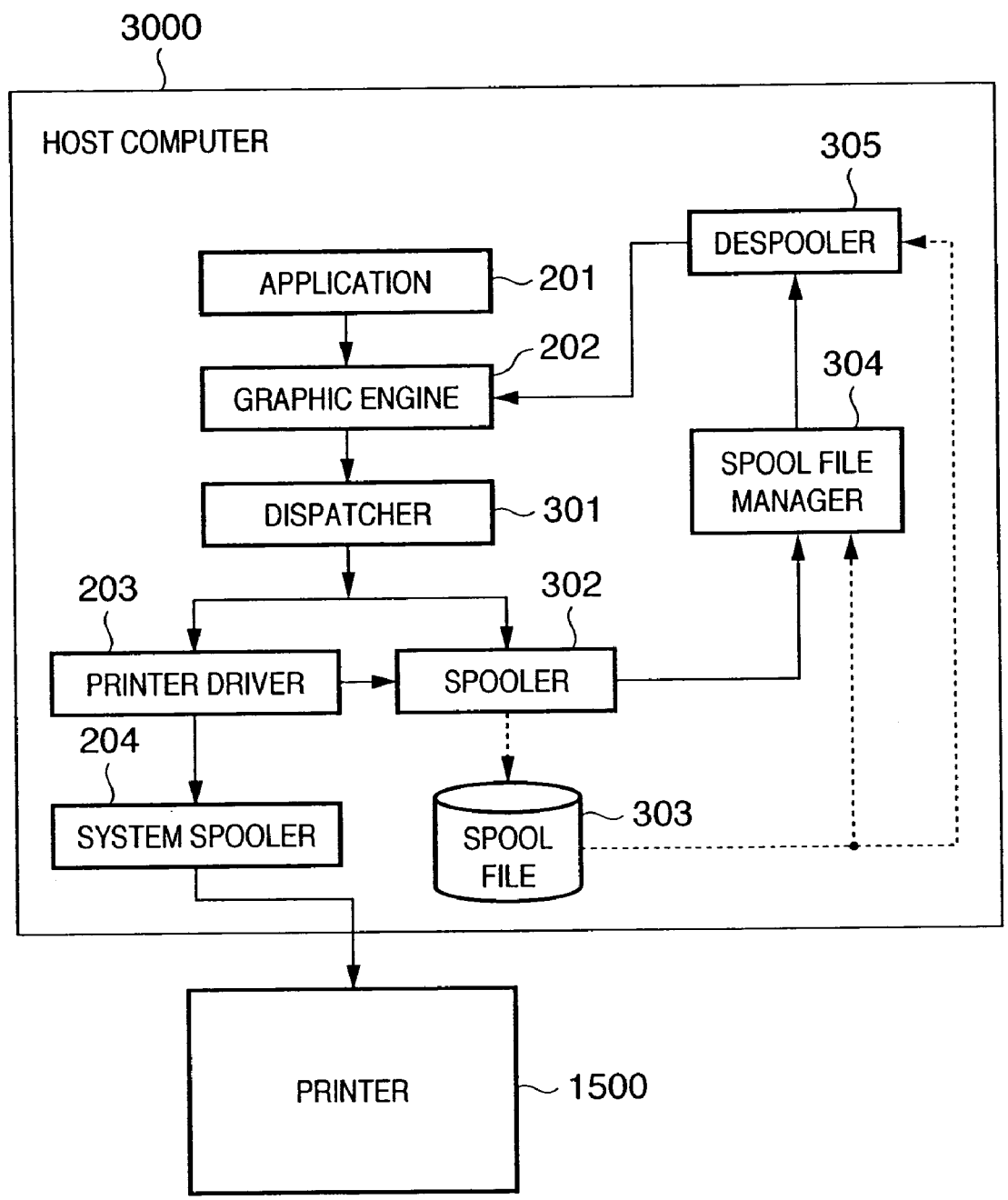
FIG. 3 is a diagram showing another example of the software module configuration required to implement a print process in the host computer 3000 according to the embodiment of the present invention.

FIG. 3 is a diagram showing the software module configuration obtained by expanding the system shown in FIG. 2. In FIG. 3, upon sending a print command from the graphic engine 202 to the printer driver 203, a spool file 303 of an intermediate code is generated. In the system shown in FIG. 2, the application 201 is released from the print process after the printer driver 203 has converted all print commands from the graphic engine 202 into control commands of the printer. By contrast, in the system shown in FIG. 3, the application 201 is released from the print process when a spooler 302 has converted all print commands into intermediate code data, and output them to the spool file 303. Normally, the latter process requires a shorter time than the former process.

In the module configuration shown in FIG. 3, the contents of the spool file 303 can be processed. As a result, functions such as a tab paper print function, an enlargement/reduction function, a function of printing a plurality of pages on one page in a reduced scale, and the like, that the application does not have can be implemented for print data from the application.

In order to process print data, the user makes setups from a window provided by the printer driver 203, which saves the setup contents on the RAM 2 or external memory 11.

Details of FIG. 3 will be explained below. As shown in FIG. 3, in this expanded processing system, a DDI function as a print command from the graphic engine 202 is received by a dispatcher 301. If the print command (DDI function) received from the graphic engine 202 is based on a print command (GDI function) issued from the application 201 to the graphic engine 202, the dispatcher 301 loads the spooler 302 stored in the external memory 11 onto the RAM 2, and sends the print command (DDI function) to the spooler 302 in place of the printer driver 203.

The spooler 302 interprets the received print command, converts it into an intermediate code for each page, and outputs that code to the spool file 303. The spool file 303 of an intermediate code stored for each page will be referred to as a page description file (PDF) hereinafter.

Also, the spooler 302 acquires process setups (Nup, tab paper print, 2-sided print, staple, color/monochrome designation, etc.) associated with print data, which are set in the printer driver 203, from the printer driver 203, and saves them as a file for each job in the spool file 303. The setup file set for each job will be referred to as a job description file (to be also referred to as a spool description file; SDF) hereinafter.

This job description file will be described later. Note that the spool file 303 is generated as a file on the external memory 11, but may be generated on the RAM 2. Furthermore, the spooler 302 loads a spool file manager 304 stored on the external memory 11 onto the RAM 2, and informs the spool file manager 304 of the generation state of the spool file 303. After that, the spool file manager 304 checks based on the process setup contents saved in the spool file 303 if a print process can be executed.

When the spool file manager 304 determines that the print process can be executed using the graphic engine 202, it loads a despooler 305 stored in the external memory 11 onto the RAM 2, and instructs the despooler 305 to execute a print process of the page description file of the intermediate code described in the spool file 303.

The despooler 305 processes the page description file of the intermediate code contained in the spool file 303 in accordance with the job description file including process setup information contained in the spool file 303 to re-generate a GDI function, and outputs the GDI function via the graphic engine 202 again.

If the print command (DDI function) received from the graphic engine 202 is based on a print command (GDI function) issued from the despooler 305 to the graphic engine 202, the dispatcher 301 sends a print command to the printer driver 203 in place of the spooler 302.

The printer driver 203 generates a printer control command described in a page description language or the like on the basis of the DDI function acquired from the graphic engine 202, and outputs it to the printer 1500 via the system spooler 204.

<Save Process of Print Intermediate Data>

Figure 5:
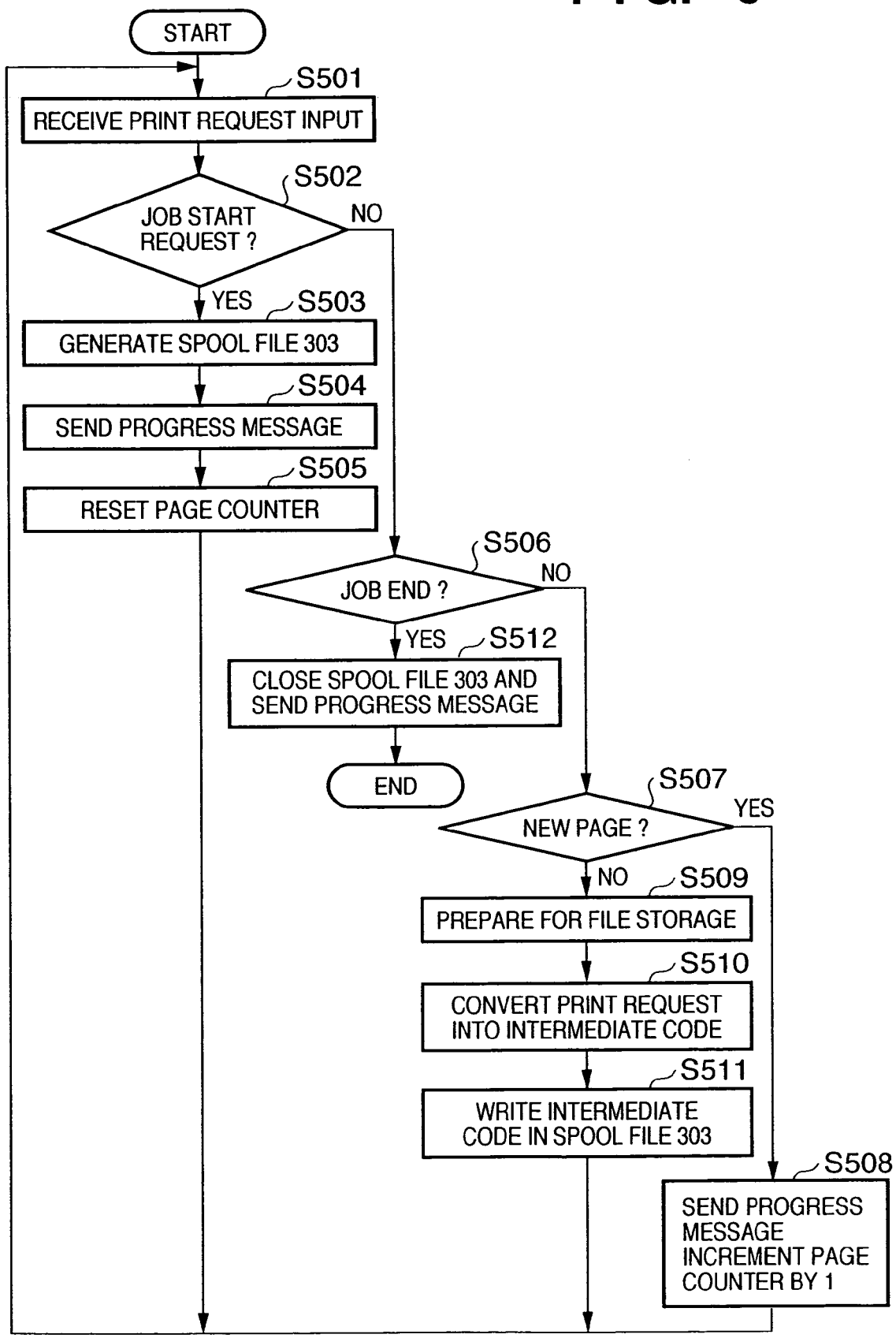
FIG. 5 is a flow chart showing the process in a spooler 302 according to the embodiment of the present invention.

FIG. 5 is a flow chart showing the process in a save step for each page upon generating the spool file 303 in the spooler 302.

Figure 15:
FIG. 15 shows an example of a GUI displayed upon executing a 2-sided print process of tab paper sheets according to the embodiment of the present invention.

In step 501, the spooler 302 accepts a print request from the application via the graphic engine 202. The application displays a dialog used to input print setups, as shown in FIG. 15 (to be described later), and the printer driver 203 passes the print setups input using this dialog to the spooler 303.

The spooler 302 determines in step 502 whether or not the accepted print request is a job start request. If it is determined that the accepted print request is a job start request, the flow advances to step 503, and the spooler 302 generates a spool file 303 used to temporarily save intermediate data. The spooler 302 informs the spool file manager 304 of the progress of the print process in step 504, and resets its page counter to 1 in step 505.

Note that the spool file manager 304 loads and stores job information, process setups, and the like for a job, the print process of which has started, from the spool file 303.

On the other hand, if it is determined in step 502 that the accepted print request is not a job start request, the flow advances to step 506. The spooler 302 determines in step 506 whether or not the accepted request is a job end request. If it is determined that the accepted request is not a job end request, the flow advances to step 507 to check if the accepted request is a new page request.

If it is determined in step 507 that the accepted request is a new page request, the flow advances to step 508, and the spooler 302 informs the spool file manager 304 of the progress of the print process. The spooler 302 then increments the page counter, closes a page description file that stores the intermediate code, and generates the next page description file.

If it is determined in step 507 that the accepted print request is not a new page request, the flow advances to step 509, and the spooler 302 prepares to save an intermediate code in the page description file. In order to store the print request in the spool file 303, the spooler 302 converts the DDI function of the print request into an intermediate code in step 510. In step 511, the spooler 302 writes the print request (intermediate code) that has been converted into a storable format in step 510 in the page description file of the spool file 303.

After that, the flow returns to step 501 to accept the next print request from the application. The spooler 302 repeats a series of processes from step 501 to step 511 until it receives a job end request (End Doc) from the application. At the same time, the spooler 302 acquires information such as process setups and the like stored in a DEVMODE structure from the printer driver 203, and stores the acquired information in the spool file 303 as a job description file.

If it is determined in step 506 that the print request from the application is a job end request, since all print requests from the application are complete, the flow advances to step 512 to inform the spool file manager 304 of the progress of the print process, thus ending the process.

<Generation of Spool File>

Figure 6:
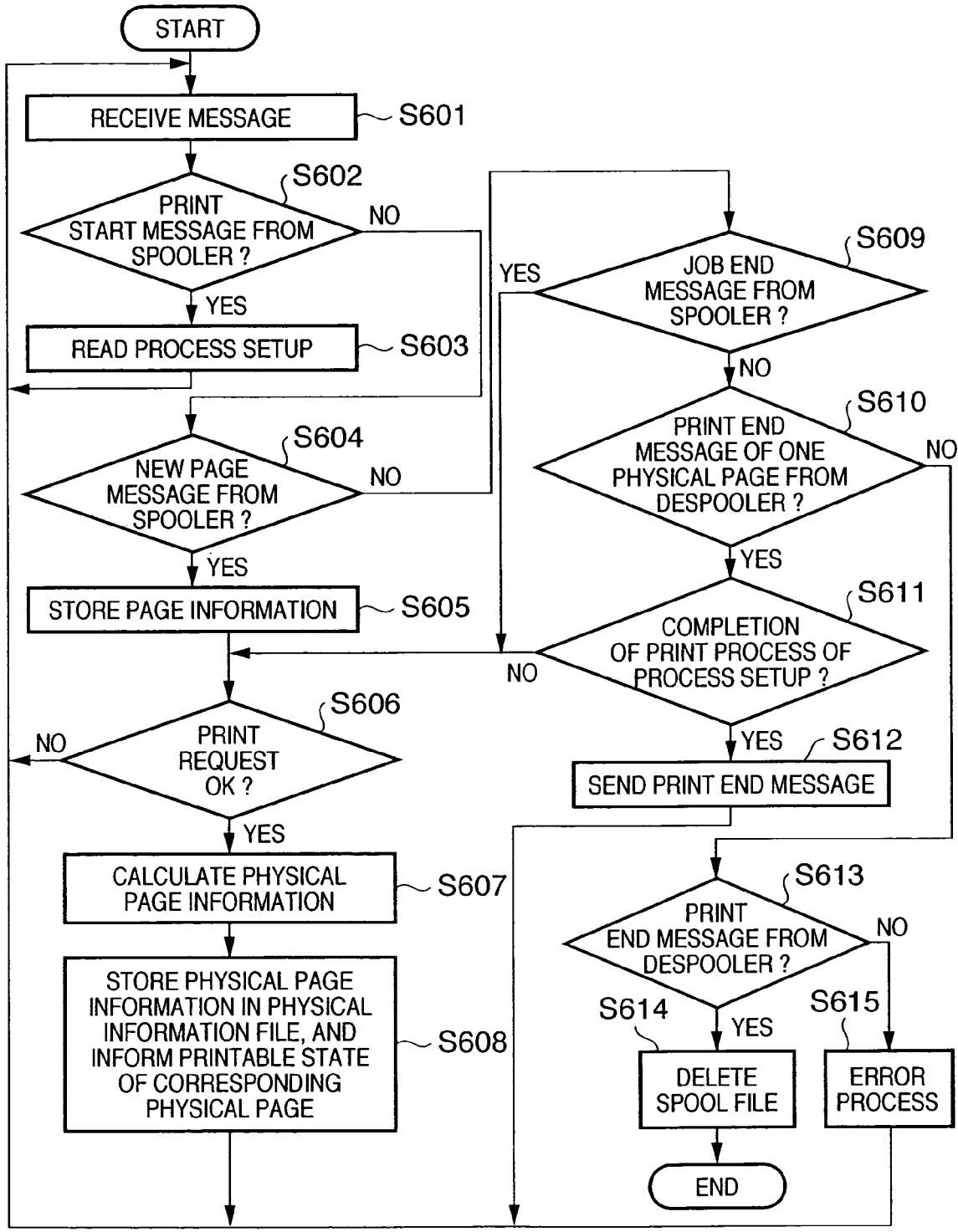
FIG. 6 is a flow chart showing print control in a spool file manager 304 according to the embodiment of the present invention.

FIG. 6 is a flow chart showing details of the control between the generation process of the spool file 303 and that of print data (to be described later) in the spool file manager 304.

In step 601, the spool file manager 304 accepts the progress message of the print process from the spooler 302 or despooler 305. The spool file manager 304 checks in step 602 if the progress message is a print start message sent from the spooler 302 in step 504 above. If YES in step 602, the flow advances to step 603, and the spool file manager 304 reads the print process setups from the spool file 303 to start job management.

The tab paper print setups in the present invention are stored in the spool file 303, and the spool file manager 304 can read them in step 603.

On the other hand, if the spool file manager 304 determines in step 602 that the progress message is not a print start message from the spooler 302, the flow jumps to step 604 to check if the progress message is a print end message of one logical page sent from the spooler 302 in step 508 above. If YES in step 604, the flow advances to step 605, and the spool file manager 304 stores logical page information for that logical page.

The spool file manager 304 then checks in step 606 if a print process of one physical page for n logical pages which have been spooled at that time can be started. If YES in step 605, the flow advances to step 607 to determine a physical page number on the basis of the number of logical pages assigned to one physical page to be printed.

As for calculation of physical pages, for example, when the process setups designate to lay out four logical pages per physical page, the first physical page is ready to print when the fourth logical page has been spooled, and the first physical page is determined at that time. Subsequently, the second physical page is ready to print when the eighth logical page has been spooled.

Even when the total number of logical pages is not a multiple of the number of logical pages to be laid out per physical page, logical pages to be laid out per physical page can be determined by the spool end message in step 512. However, since a tab paper print process is to be made in this embodiment, the number of logical pages to be laid out per physical page is 1.

Figure 8:
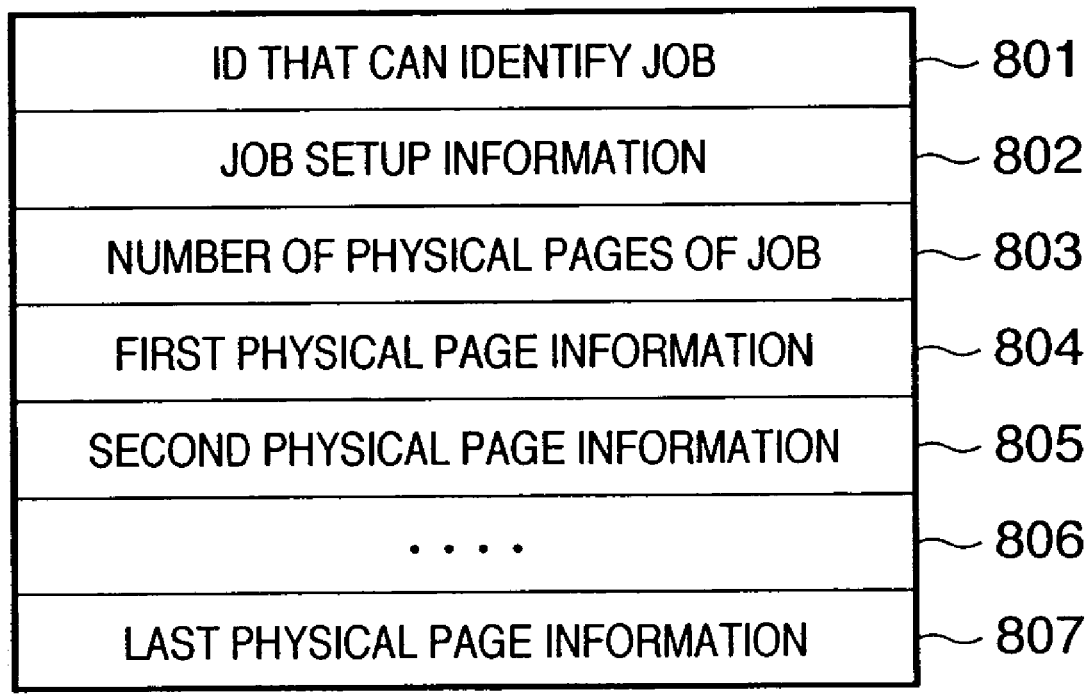
FIG. 8 shows an example of the data format to be passed upon issuing a print request of physical pages from the spool file manager 304 to the despooler 305 according to the embodiment of the present invention.

In step 608, the spool file manager 304 saves information such as a logical page number which forms a physical page which is ready to print in the format shown in FIG. 8, its physical page number, and the like in a job output setup file (a file containing physical page information), and informs the despooler 305 that the physical page information for one physical page is added.

The flow then returns to step 601 to wait for the next message. In this embodiment, when print data for one page, i.e., a logical page or pages which forms or form one physical page has or have been spooled, a print process can be started even when spooling of all print jobs is not complete.

On the other hand, if it is determined in step 604 that the progress message is not a print end message of one logical page from the spooler 302, the flow advances to step 609, and the spool file manager 304 checks if the progress message is a job end message sent from the spooler 302 in step 512 above. If YES in step 609, the flow advances to step 606 above; otherwise, the flow advances to step 610, and the spool file manager 304 checks if the received message is a print end message of one physical page from the despooler 305.

If it is determined in step 610 that the progress message is a print end message of one physical page, the flow advances to step 612 to check if a print process for all pages designated by the process setups is complete. If YES in step 612, the flow advances to step 613, and the spool file manager 304 informs the despooler 305 of the end of the print process. On the other hand, if pages to be printed designated by the process setups still remain, the flow advances to step 606 above.

The despooler 305 of this embodiment assumes one physical page as a unit of a print process to be executed. In step 608, information required to execute a print process of one physical page is sequentially saved in a file in a re-usable format. If such information need not be re-used, information for one physical page is overwritten in turn on a high-speed medium such as a shared memory, thus saving the time and resources.

If the progress of spooling is faster than that of despooling, or if despooling starts after completion of spooling of all pages, a page printable message is not sent for each physical page in step 608, and a message indicating that a plurality of or all physical pages are ready to print may be sent in accordance with the progress on the despooler side, thus reducing the number of messages to be sent.

If it is determined in step 610 that the progress message is not a print end message of one physical page from the despooler 305, the flow jumps to step 613, and the spool file manager 304 checks if the progress message is a print end message from the despooler 305. If YES in step 613, the flow advances to step 614, and the spool file manager 304 deletes the corresponding page description file to end the process. On the other hand, if the progress message is not a print end message from the despooler 305, the flow advances to step 615 to execute another normal process (e.g., an error process), thus waiting for the next message.

<Output of Spool File>

Figure 7:
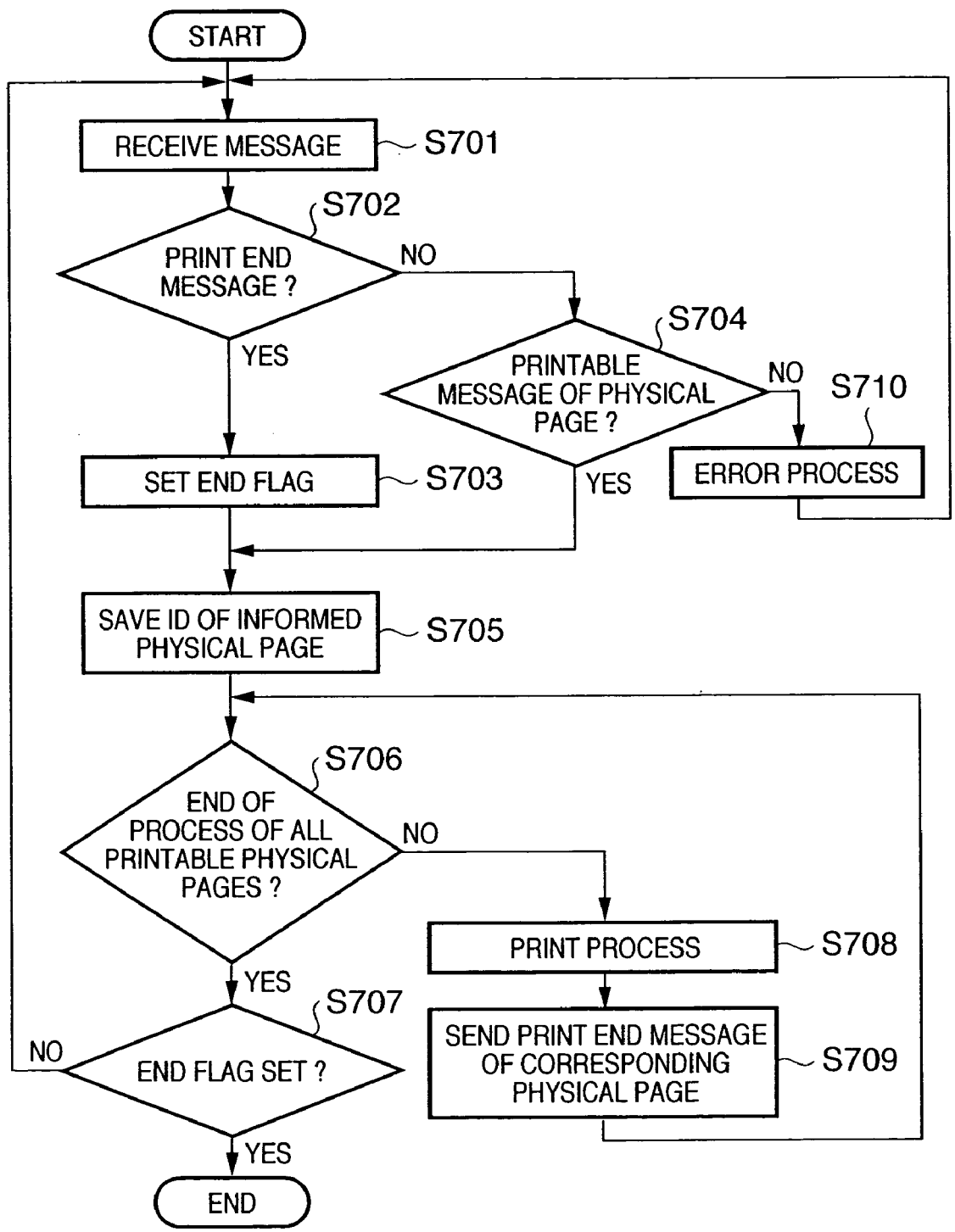
FIG. 7 is a flow chart showing the process in a despooler 305 according to the embodiment of the present invention.

FIG. 7 is a flow chart showing details of the generation process of print data in the despooler 305.

The despooler 305 reads out necessary information (page description file and job description file) from the spool file 303 in response to a print request from the spool file manager 304, and generates print data. The method of transferring the generated print data to the printer has been explained using FIG. 3.

Upon generating print data, the despooler 305 receives a message from the aforementioned spool file manager 304 in step 701. The despooler 305 checks in step 702 if the received message is a job end message. If YES in step 702, the flow advances to step 703 to set an end flag, and the flow then advances to step 705.

On the other hand, if it is determined in step 702 that the received message is not a job end message, the flow advances to step 704 to check if the message is a print start request of one physical page sent in step 608. If NO in step 704, the flow advances to step 710 to execute an error process. The flow then returns to step 701 to wait for the next message.

If it is determined in step 704 that the message is a print start request of one physical page, the flow advances to step 705, and the despooler 305 saves the ID of a physical page that can undergo a print process and is designated by the message in step 704. The despooler 305 checks in step 706 if a print process of all pages corresponding to the physical page IDs saved in step 705 is complete.

If the process for all physical pages is complete, the flow advances to step 707 to check if the end flag is set in step 703. If the end flag is set, the despooler 305 determines that the print process of the job is complete, and sends its process end message to the spool file manager 304, thus ending the process. If it is determined in step 707 that no end flag is set, the flow returns to step 701 to wait for the next message. On the other hand, if it is determined in step 706 that printable physical pages still remain, the flow advances to step 708. In step 708, the despooler 305 reads out a non-processed physical page ID from the saved physical page IDs in turn, reads information required to generate print data of a physical page corresponding to the readout physical page ID, and executes a print process.

In the print process, the despooler 305 converts a print request command stored in the spool file 303 into a format (GDI function) that the graphic engine 202 can recognize, and transfers the converted command. As for process setups that designate to lay out a plurality of logical pages on one physical page (to be referred to as N-page print setups hereinafter), conversion is made in this step in consideration of a reduced-scale layout.

Upon completion of the required print process, the despooler 305 sends a print data generation end message of one physical page to the spool file manger 304 in step 709. The flow then returns to step 706 to repeat the print process for all the printable physical page IDs saved in step 705.

The flow of print processes using the dispatcher 301, spooler 302, spool file manager 304, and despooler 305 has been explained. With the above processes, since the application 201 is released from the print process at the timing when the spooler 302 generates an intermediate code and stores it in the spool file 303, the processing time can be shorter than that required when the application directly outputs data to the printer driver 203.

<Configuration of Job Output Setup File>

FIG. 8 shows an example of a job output setup file job output setup file that saves information which is generated by the spool file manager 304 in step 608, and forms a printable physical page. A field 801 stores an ID used to identify a job, and may hold a file name or the name of a shared memory that saves this information. A field 802 stores job setup information.

The job setup information contains a structure required to start a job print process with respect to the graphic engine 202, tab paper print setups of the present invention, designation of N-page print setups, designation of additional drawing such as a page frame, finishing designation such as the number of copies, stapling, and the like, and so forth, i.e., information that can be set one each per job. The job setup information field 802 saves a required number of pieces of information in correspondence with functions for a job.

A field 803 stores the number of physical pages of a job, i.e., indicates that a plurality of pieces of physical page information designated by this number are saved after this field. Since this embodiment informs the number of printable physical pages, an operation can be made without this field. After this field, a plurality of pieces of physical page information are stored from a field 804 to the last field in correspondence with the value stored in the field 803. Physical page information will be described later using FIG. 10.

FIG. 9 shows an example of the job setup information shown in the field 802 of FIG. 8. A field 901 stores the total number of physical pages. A field 902 stores the total number of logical pages. The fields 901 and 902 are used when the number of pages and the like are to be printed as additional information of print data.

When a print process continues, these fields store tentative values or the spool file manager 304 postpones generation of information of printable physical pages until completion of the print process. A field 903 stores copy set count information which designates the number of sets of copies to be printed of this print job. A field 904 designates whether or not a print process is to be made for each set of copies if the field 903 sets to print a plurality of sets of copies. A field 905 stores finishing information such as stapling, punch, Z-fold, or the like, and is designated when a finisher is available on the printer main body or externally.

A field 906 stores additional print information, i.e., saves information to be added to a job such as ornaments (e.g., page frame), additional information (e.g., date), a user name, a page count, watermark print, and the like. The number of fields included in this job setup information increases with increasing number of functions. For example, if a 2-sided print function is available, a field for saving designation of the 2-sided print function is added.

Figure 10:
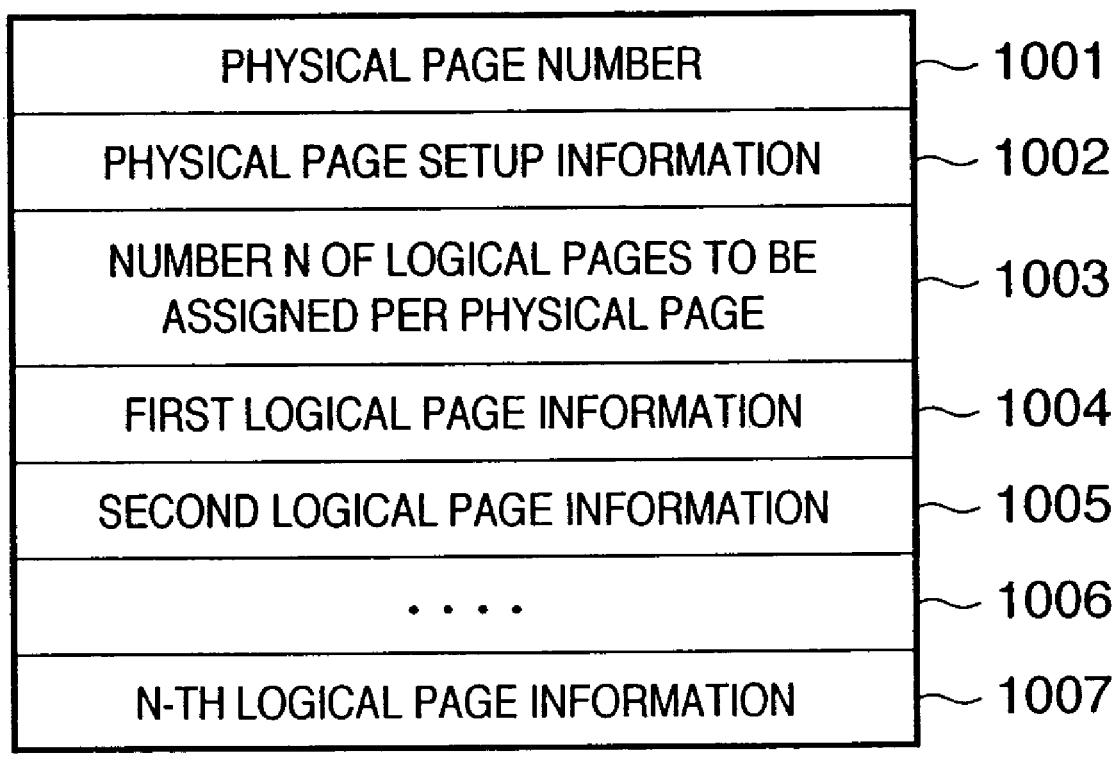
FIG. 10 shows an example of the data format to be passed upon issuing a print request of physical pages from the spool file manager 304 to the despooler 305 according to the embodiment of the present invention.

FIG. 10 shows an example of physical page information shown in the field 804 in FIG. 8. A first field 1001 stores a physical page number, which value is used upon managing the print order or additionally printing a physical page number. A field 1002 stores physical page setup information. When a layout or color/monochrome setup can be designated for each physical page, this field stores a layout or color/monochrome setup.

A field 1003 stores the number of logical pages to be assigned to this physical page. When four pages are assigned to one physical page, this field saves "4" or an ID indicating a 4-page print mode. A field 1004 and subsequent fields save information of logical pages in correspondence with the number designated in the field 1003.

Depending on the number of pages printed from the application 201, the number of pages designated in the field 1003 becomes often smaller than the number of actual page data. Such case is coped with by saving special data indicating a blank page in logical page information. However, in the tab paper print function of the present invention, the number of logical pages per physical page is 1.

Figure 11:
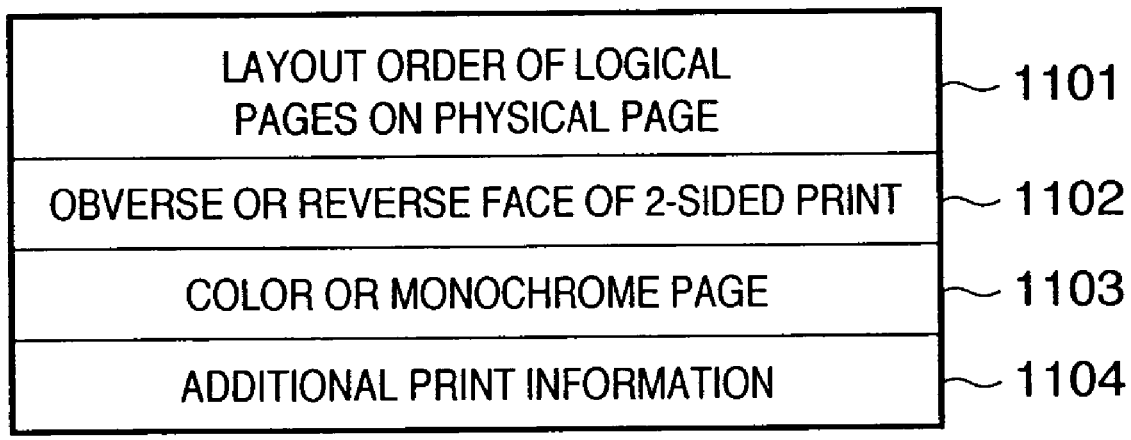
FIG. 11 shows an example of the data format to be passed upon issuing a print request of physical pages from the spool file manager 304 to the despooler 305 according to the embodiment of the present invention.

FIG. 11 shows an example of physical page setup information in the field 1002. A field 1101 stores a layout order of logical pages on a physical page, i.e., saves designation of a layout order of logical pages (from upper left to right, from upper left to lower, and the like) on a physical page in the N-page print function. In some systems, such layout order field is not used, and the field 1004 and subsequent fields that store logical page information are arranged not in an order of page numbers but in a layout order, in place of the setup in the field 1101.

A field 1102 stores obverse/reverse information of the 2-sided print function. In the present invention, the obverse face of a tab paper sheet is printed first, and the reverse face of the tab paper sheet is then printed. In such case, a value indicating the obverse face is stored upon printing on the tab obverse face, and a value indicating the reverse face is substituted upon printing on the tab reverse face.

In addition, the field 1102 is used upon adjusting, e.g., binding margins on the obverse and reverse faces. A field 1103 stores designation indicating a color or monochrome page. If a printer has monochrome and color modes, the value in this field is used when a color page of a document which includes both color and monochrome pages is to be printed in the color mode, and a monochrome page of this document is to be printed in the monochrome mode.

With this information, a color printer can change processes for respective pages as an auto color mode. That is, transfer control can be made by rotating an intermediate transfer member (intermediate transfer drum or belt) or a transfer member (transfer drum or belt) in correspondence with the number of device colors (four in case of YMCK) for a color page, and by rotating it once for black of a monochrome page.

A field 1104 stores additional print information which is used upon printing additional information such as a page count, date, or the like is to be printed on a physical page. In the physical page setup information, fields are added in correspondence with system functions.

Figure 12:
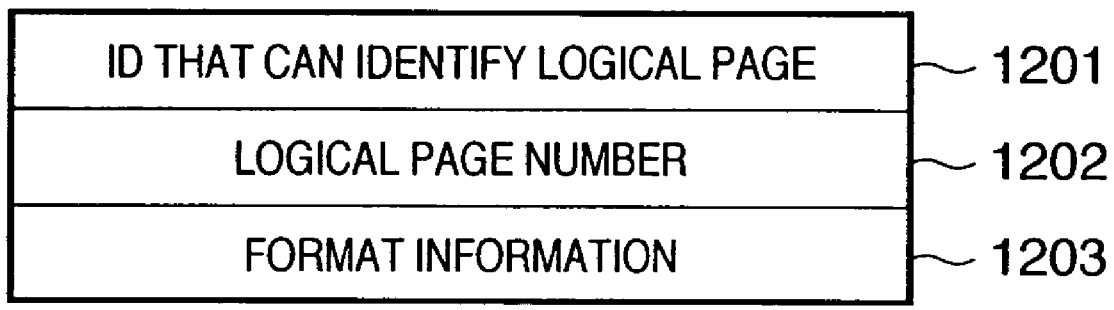
FIG. 12 shows an example of the data format to be passed upon issuing a print request of physical pages from the spool file manager 304 to the despooler 305 according to the embodiment of the present invention.

FIG. 12 shows an example of logical page information in the field 1004. A field 1201 stores the ID of a logical page. Using this ID, an intermediate code of a page description file corresponding to the logical page is referred to from the spool file 303. The intermediate code of a logical page need only be accessed using this ID, and a file or memory pointer, or the intermediate code itself that forms a logical page may be stored.

A field 1202 stores a logical page number, which is used when the logical page number is printed as additional information or as auxiliary information of the logical page ID. Format information in a field 1203 saves various setup items which can be designated for each logical page. For example, additional print information such as a page frame or the like, and various kinds of setup information such as an enlargement/reduction factor and the like, which are set for each logical page, are saved. Also, attribute information for a logical page such as color/monochrome information for each logical page can be saved if necessary. Conversely, in a system which need not change setups for respective logical pages or does not require any attribute information for each logical page, the field 1203 may be omitted.

The job output setup file has the aforementioned configuration. Note that a job description file has nearly the same configuration, and has a print style (1-sided, 2-sided, booklet print), print layout (tab paper print, Nup, poster print), additional information (addition of watermark, date, user name), the number of copies, and paper size information as a job, and also the layout order of logical pages, obverse/reverse face information of the 2-sided print function, color mode, and the like for each physical page.

First Embodiment

Figure 13:
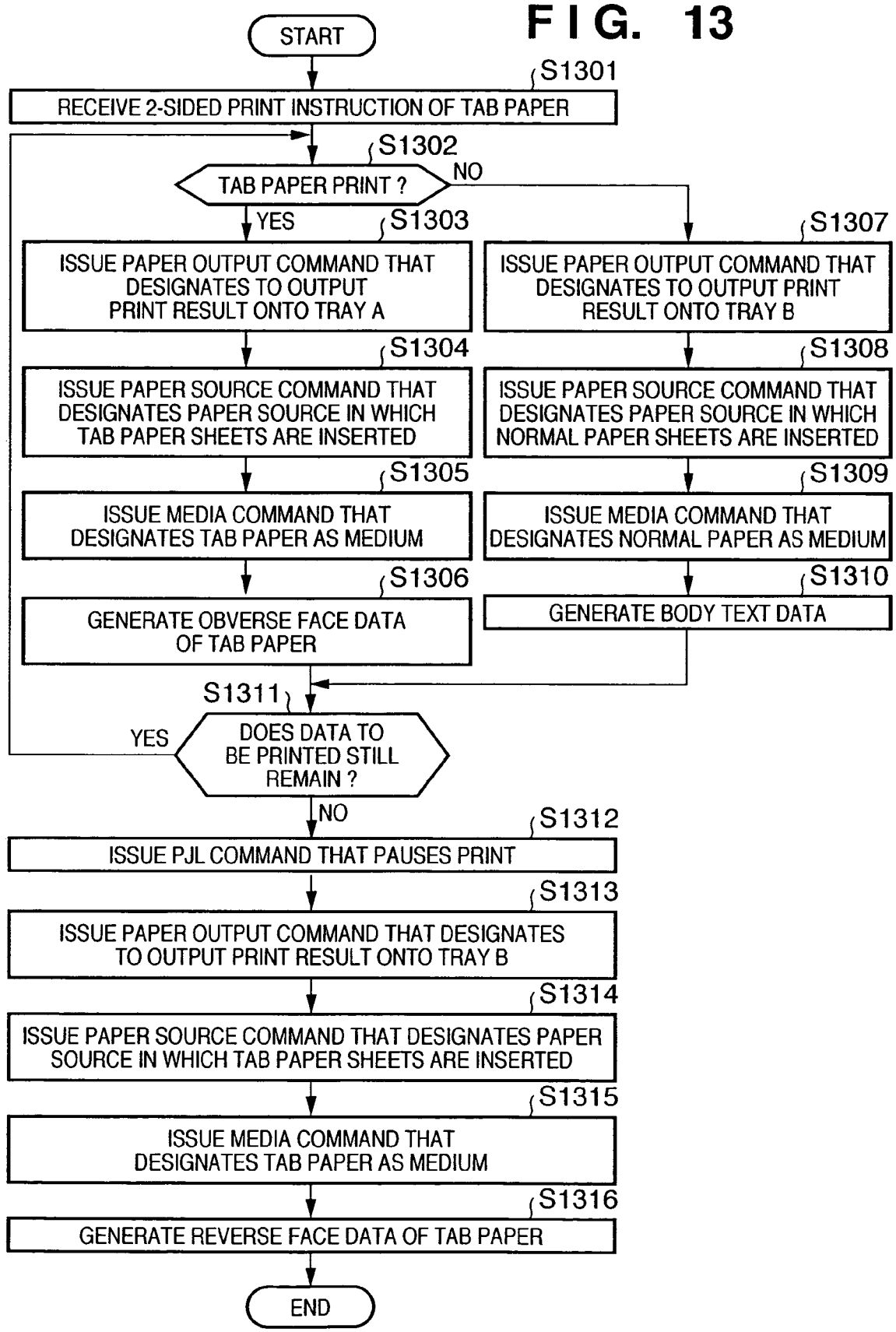
FIG. 13 is a flow chart showing the process on the host computer 3000 side in the print process according to the embodiment of the present invention.
Figure 14:
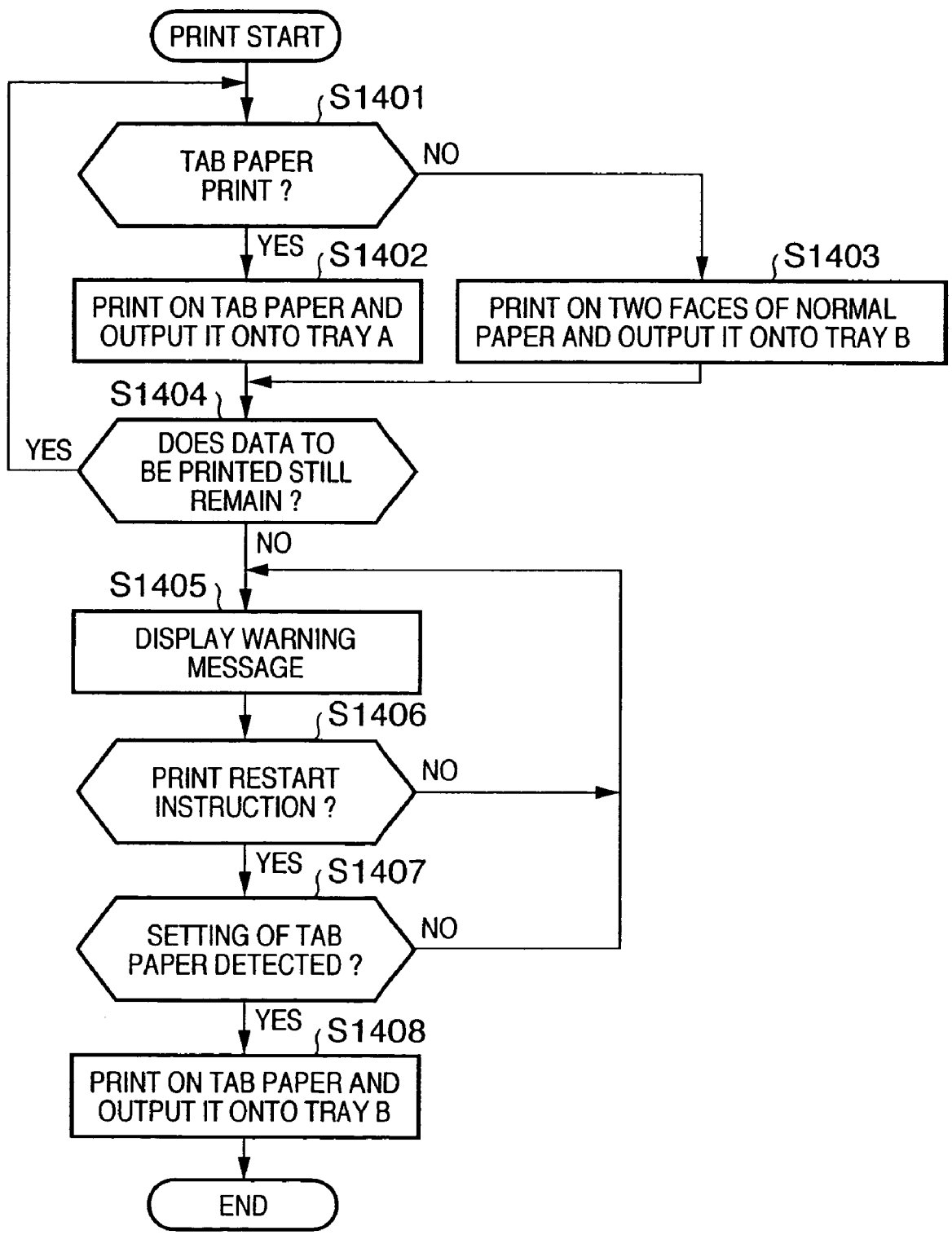
FIG. 14 is a flow chart showing the process on the printer 1500 side in the print process according to the embodiment of the present invention.
Figure 16:
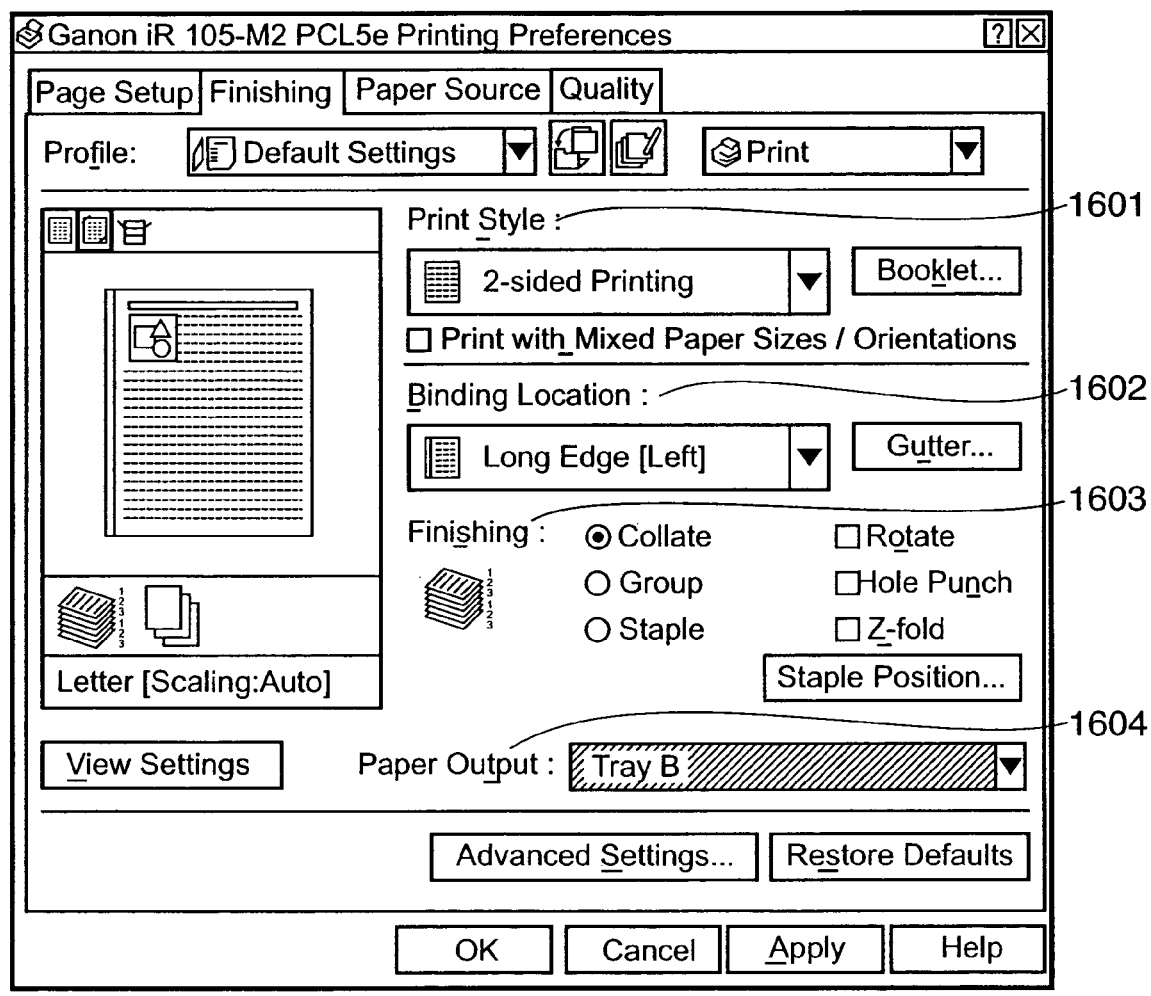
FIG. 16 shows an example of a GUI displayed upon designating a tray used to output body text according to the embodiment of the present invention.

FIG. 13 is a flow chart showing the process of the printer driver 203 on the host computer 3000 side upon executing the 2-sided print process of tab paper sheets according to the first embodiment of the present invention. FIG. 14 is a flow chart showing the process on the printer 1500 side upon executing the 2-sided print process of tab paper sheets according to this embodiment. FIGS. 15 and 16 show examples of GUIs displayed on the CRT display 10 of the host computer 3000 upon executing the 2-sided print process of tab paper sheets. FIG. 17 is a table for explaining the method of executing the 2-sided print process of tab paper sheets at command level.

This embodiment will be described in detail below using the flow charts of FIGS. 13 and 14. In step 1301, a 2-sided print execution instruction of tab paper sheets is accepted from the user. The 2-sided print instruction is issued based on inputs on GUIs shown in FIGS. 15 and 16. FIG. 15 shows an example of a GUI window used to make setups associated with tab paper sheets. In FIG. 15, With "Sheet for Insertion" 1501, the user selects the type of sheet to be inserted between print sheets on which body text data are printed. In this embodiment, "Tab Paper" is selected for "Sheet for Insertion" 1501. With "Print on" 1502, the user sets a print pattern to be made on the inserting sheet. The print patterns that can be set in this embodiment include, for example, four different setups, i.e., "Only Front Side", "Only Back Side", "Both Sides", and "None". In case of this embodiment shown in FIG. 15, "Both Sides" is set for "Print on". With "Paper Source" 1503, the user sets a cassette or tray that stores the inserting sheet. In this case, "Drawer3" is set for "Paper Source" 1503. "Insertion Positions" 1504 is a position setting item used to set the page position or positions of body text where the inserting sheet is to be inserted. In this case, the third and sixth pages are selected for "Insertion Positions" 1504. Note that the print setup including designation of 1-sided/2-sided printing of body text data can be set using another GUI shown in FIG. 16. With "Paper Output" 1505, the user sets a tray on which printed tab sheet papers are to be output. In this case, "Tray A" is set for "Paper Output" 1505.

"Print on" 1502 shown in FIG. 15 is a menu used to set designation of page imposition (print designation for two faces, i.e., obverse and reverse faces of a sheet) on an inserting sheet (tab paper in this embodiment). Therefore, designation made using "Print on" 1502 is independent from 2-sided printing designation of body text data. That is, even if 1-sided printing is designated for body text data on a setting window in FIG. 16, when "Both Sides" is designated for "Print on" 1502 on the window (FIG. 15) used to set the print process for an inserting sheet, a 1-sided print process is executed for body text data, and a 2-sided print process is executed for the inserting sheet.

However, as described in "Background of the Invention", it is difficult to reverse a tab paper sheet since it is formed of a paperboard. Hence, even when "Both Sides" is designated for "Print on" 1502, a 2-sided print process is attained by printing only one face of a tab paper sheet in a single print process, temporarily exhausting the tab paper sheet outside the apparatus, and then printing the other face, in place of a 2-sided print process that reverses the tab paper sheet inside the apparatus.

Note that this embodiment and the second embodiment to be described later are premised on the printer 1500 that exhausts sheets with their printed faces facing down, i.e., in a face-down mode. For this reason, the order of pages of print page data transmitted from the host computer 3000 to the printer 1500 is the same as that of body text data. Since page data are printed in the order they are transmitted, and printed sheets are exhausted and are stacked on the tray in the order they are printed, a printed document can be aligned in the page order. However, in case of the printer 1500 that exhausts printed sheets with their printed faces facing up, i.e., in a face-up mode, print data are normally transmitted from the host computer 3000 in turn from the last page of body text data. Hence, in the face-up mode, the data transmission order of this embodiment can be set from the last page of body text data. When a 2-sided print mode is designated for body text data, the transmission order does not match the page order in some cases depending on the sheet exhaust direction of the printer 1500 or the 2-sided print sequence, as will be easily understood by those who are skilled in the art.

Even when the exhaust mode of the printer 1500 is the face-up mode, the host computer 300 may transmit body text data in the page order, and the printer 1500 may rearrange page data in the print order to execute the print process in a desired order. In the present invention, the transmission order of data to be printed is selected for the purpose of finally and appropriately inserting and outputting a tab paper sheet designated with the 2-sided print mode at a desired position of body text data pages. Hence, the sheet exhaust direction unique to the printer 1500 and the data transmission order corresponding to that sheet exhaust direction can select optimal configurations as needed to achieve the above purpose.

FIG. 16 shows an example of a GUI window used to make setups associated with a body text print process. The user selects, using "Print Style" 1601, a style of print process to be made on print sheets on which body text data are to be printed. The print styles that can be set in this embodiment include, for example, three different setups, i.e., "1-sided Printing", "2-sided Printing", and "Booklet Printing".

In case of this embodiment shown in FIG. 16, "2-sided Printing" is selected for the print style. The user sets the location of a binding margin of body text on a print sheet using "Binding Location" 1602. As the types of binding margins, right long edge, left long edge, top short edge, bottom short edge, and the like are available.

In this embodiment, left long edge is set. Furthermore, the user sets the finishing state of a print result using "Finishing" 1603. The finishing states include, e.g., "Collate", "Group", and the like. In this embodiment, "Collate" is set.

The user sets the output destination of print sheets on which body text data are printed using "Paper Output" 1604. In this case, "Tray B" is selected.

Upon reception of the 2-sided print instruction in step 1301, the print process starts, and it is checked in step 1302 if a tab paper print process is to be made. In the example shown in FIG. 15, since the third and sixth pages are to undergo the tab paper print process, the first and second pages correspond to body text data. Hence, it is determined in step 1302 that no tab paper print process is to be made, and a paper output command that designates to output a print result to tray B is issued to the printer 1500 in step 1307. Subsequently, a paper source designation command that designates a paper source in which normal paper sheets are inserted, and a media command that designates normal paper as a medium are issued in steps 1308 and 1309. In step 1310, body text data is generated, and is transmitted to the printer 1500 side.

The flow advances to step 1311 to check if data to be printed still remain. If data to be printed still remain, the flow returns to step 1302 to repeat the above processes. In this embodiment, since both the first and second pages correspond to body text data, the processes in steps 1302 to 1310 are repeated.

Upon starting the print process of the third page, since the determination result in step 1302 indicates a tab paper print process for the first time in the above example, the flow advances to step 1303. In step 1303, a paper output command that designates to output a print result to tray A is issued. In steps 1304 and 1305, a paper source designation command that designates a paper source in which tab paper sheets are inserted, and a media command that designates tab paper as a medium are issued. In step 1306, obverse face data of a tab paper sheet is generated, and is transmitted to the printer 1500 side.

Upon completion of the generation process of the obverse face data of the tab paper sheet in step 1306, it is checked in step 1311 if data to be printed still remain. If all data have been processed, a reverse face print process of tab paper sheets starts. On the other hand, if data to be printed still remain, the flow returns to step 1302 to continue to the print process. In the flow of processes corresponding to the setup example shown in FIG. 15, after body text data of the fourth and fifth pages are printed, and obverse face data of a tab paper sheet as the sixth page is printed, the reverse face print process of tab paper sheets starts.

As described above, upon completion of the print processes of body text data and the obverse face data of tab paper sheets, a PJL command that pauses the print process until an instruction comes from the user interface 22 of the printer 1500 is issued in step 1312. Subsequently, a paper output command that designates to output a print result to tray B is issued in step 1313, a paper source designation command that designates a paper source in which tab paper sheets are inserted is issued in step 1314, and a media command that designates tab paper as a medium are issued in step 1315.

After that, reverse face data of tab paper sheets are generated and are transmitted to the printer 1500 side in step 1316.

In step 1316, the reverse face data of tab paper sheets as the third and sixth pages are generated. However, the reverse face data of tab paper sheets are not created on the application 201. When the 2-sided print mode of tab paper sheets is designated on the user interface of the printer driver 203, the printer driver 203 internally generates images of the reverse faces of tab paper sheets. In this generation process, obverse face data of tab paper sheets as the third and sixth pages in the 1-sided print mode are saved as the images of reverse faces of tab paper sheets upon generating the spool file 303. However, these data cannot be directly used as reverse face data. Hence, images used upon printing obverse face data are converted into mirror images to generate images of reverse face tabs.

More specifically, for example, each obverse face tab image shown in FIG. 4A is horizontally flipped about a line segment which passes the vertical and horizontal central points of a tab and is parallel to the vertical direction of the tab, and the positions of data that form the tab image are adjusted, thus generating a reverse face image, as shown in FIG. 4B.

In the above example, mirror images have been exemplified. In order to improve the appearance of tab images, the printer driver 203 may allow the user to edit tab images. For example, a reverse face tab image shown in FIG. 4C may be generated. Also, the user may create a tab image layout using application software (wordprocessing software, image edit software, or the like) on the host computer 300, and may pass it to the printer driver 203 upon transmission of print data or may register it in advance.

The print process flow on the printer 1500 side upon executing the 2-sided print process of tab paper sheets will be explained below using FIG. 14. It is checked in step 1401 if a tab paper print process is to be made. In the example shown in FIG. 15, since the third and sixth pages are to undergo the tab paper print process, the first and second pages correspond to body text data. Hence, since it is determined in step 1401 that no tab paper print process is to be made, body text data of the first and second pages are printed on two faces of a normal paper sheet and the printed sheet is output onto tray B in step 1403.

Upon starting the print process of the third page, since the determination result in step 1401 indicates a tab paper print process for the first time in the above example, the flow advances to step 1402. In step 1402, a tab paper sheet is fed from Drawer3 that stores tab paper sheets, only the obverse face of that tab paper sheet undergoes a print process, and the tab paper sheet is output onto tray A. Upon completion of the obverse face print process of the tab paper sheet in step 1402, it is checked in step 1404 if data to be printed still remain. If all data have been printed, a print process of the reverse faces of tab paper sheets starts. On the other hand, if data to be printed still remain, the flow returns to step 1401 to continue the print process. In the flow of processes corresponding to the setup example shown in FIG. 15, a normal paper sheet on which body text data of the fourth and fifth pages are printed is output onto tray B, and a tab paper sheet on which the obverse face data of a tab paper sheet as the sixth page is printed is output onto tray A.

In step 1405, a warning message "remove tab paper sheets from tray A, and insert removed sheets into cassette (storage unit) again" is displayed on the display window of the user interface 22 of the printer 1500. If it is determined in step 1406 that the user has pressed a button that instructs to restart the print process (e.g., an OK button) on the user interface 22 of the printer 1500, the flow advances to step 1407 to check if the sensor 24 provided to the sheet feed unit 23 detects setting of tab paper sheets. If the sensor 24 cannot detect setting of tab paper sheets, the flow returns to step 1405 to display the message "remove tab paper sheets from tray A, and insert removed sheets in a cassette (storage unit) again" on the display window of the user interface 22 of the printer 1500 again. If the sensor 24 can detect setting of tab paper sheets in step 1407, the print process of the reverse faces of the tab paper sheets as the third and sixth pages is executed in step 1408, thus ending all print processes.

In the above example, the OK button is used to instruct restart of the print process. Alternatively, the printer 1500 may be set in the offline state simultaneously with display of the warming message in step 1405, and the user may instruct to restart the print process by pressing the online button of the user interface 22.

In this embodiment, the user must input a tab reverse face print instruction at the printer 1500. However, the user can input this instruction while he or she goes to the printer 1500 to collect the print result. In addition, after the user has pressed the button in step 1406, he or she can immediately acquire both the body text and tab paper print results. Hence, the 2-sided print process of tab paper sheets can be complete without inconveniencing the user.

A print job to be generated by the printer 203 to control the processing sequence in the tab paper print process corresponding to the flow chart on the host computer 3000 side in FIG. 13 will be described below using FIG. 17.

When the print process starts upon reception of the 2-sided print instruction of tab paper in step 1301, a Job Start command that means start of a job is issued in step 1701. Then, a paper output command that designates to output a print result to tray B, a paper source designation command that designates a paper source in which normal paper sheets are inserted, and a media command that designates normal paper as a medium are issued in steps 1702, 1703, and 1704. Subsequently, image data of the first and second pages as body text data are sequentially generated in steps 1705 and 1706.

On the other hand, if the tab paper print process is determined in step 1302, a paper output command that designates to output a print result to tray A, a paper source designation command that designates a paper source in which tab paper sheets are inserted, and a media command that designates tab paper as a medium are issued in steps 1707, 1708, and 1709. Next, image data of the third page as the obverse face data of a tab paper sheet is generated in step 1710. The same processes are repeated for the fourth and fifth pages as body text data, and the sixth page as a tab paper sheet.

A PJL command that pauses the print process until an instruction comes from the user interface 22 of the printer 1500 is issued in step 1720. A paper output command that designates to output a print result to tray B, a paper source designation command that designates a paper source in which tab paper sheets are inserted, and a media command that designates tab paper as a medium are issued in steps 1721, 1722, and 1723. Then, image data of the third and sixth pages as the reverse faces of tab paper sheets are generated in turn. Finally, a command that means Job End is output in step 1726, thus generating a file of the driver.

In the description of the first embodiment, body text data are set to undergo the 2-sided print process. However, even when body text data are set to undergo a 1-sided print process, and only tab paper data are to undergo the 2-sided print process, the 2-sided print process of tab paper can be similarly done by a single operation.

As described above, according to the first embodiment of the present invention, since normal paper sheets on which body text data are printed and tab paper sheets are output onto different trays, the user need not remove only tab paper sheets from output documents.

Also, even the printer 1500 which cannot reverse a paperboard like a tab paper sheet can execute the 2-sided print process of tab paper by a single operation from the host computer 3000. Hence, the load on the user can be reduced to suppress waste of a work time, and operation miscues can be reduced by decreasing user's actions.

Second Embodiment

The first embodiment has exemplified the case wherein body text data before the tab paper print process forms an even-numbered page, i.e., the reverse face of the body text page before a tab paper sheet is inserted undergoes the print process. This embodiment will explain a case wherein body text data before the tab paper print process forms an odd-numbered page. More specifically, a case will be described below wherein "Tab Paper" is selected for "Sheet for Insertion" 1501; "Both Sides" for "Print on" 1502; and the fourth and eighth pages for "Insertion Positions" 1504 of tab paper on the GUI shown in FIG. 15.

In this embodiment, there are two processing methods when body text data before the tab paper print process forms an odd-numbered page. In the first method, the printer driver 203 generates a blank page as a reverse face.

In this case, when the printer driver 203 simply generates blank page data, that data is actually printed as a blank page, and the user may be billed for that blank page, too. For example, a printer called a hybrid machine comprises a billing unit, and it is usually the case to charge a given amount for the number of printed pages. Hence, blank page data of the reverse face is generated in combination with a command called a blank page non-billing command, thus preventing such unwanted billing. In this way, even when body text data before the tab paper print process forms an odd-numbered page, since the printer driver inserts one blank page, the page before the tab paper print process becomes an even-numbered page when viewed from the printer side, and 2-sided print process is executed.

The first method will be explained in more detail below. As the blank page non-billing command, for example, the following command can be adopted.

Esc&n35WcKANONSTRINGS BILLINGCOUNTER=UNCOUNT Such command can be set to be unique to each vendor. However, this command is merely an example, and the present invention is not limited to such specific command as long as a similar function can be achieved.

Upon reception of the blank page non-billing command, the printer 1500 discards all data that have been rasterized so far, and issues a non-billing instruction to the printer engine. The reason why all page data that have been rasterized so far are discarded upon reception of the blank page non-billing command is to prevent misuse of such blank page non-billing command, since such command may be misused deliberately if a page embedded with the blank page non-billing command is simply precluded from billing.

FIG. 18 is a table for explaining the method of inserting one blank page by the printer driver 203 when body text data before the tab paper print process forms an odd-numbered page, at command level.

Note that commands issued in steps 1801 to 1807 are the same as those issued in steps 1701 to 1706 in FIG. 17. In this embodiment, a blank page non-billing command is issued in step 1808, to allow to execute a blank page print process without billing on the reverse face of body text data of the third page. Commands issued in steps 1809 to 1815 are the same as those issued in steps 1707 to 1713. Also, subsequent commands are the same as those issued in steps 1801 to 1815 and those in FIG. 17.

In the second method of the two different methods, when body text data before the tab paper print process forms an odd-numbered page, a print mode is switched to a 1-sided print mode after the last page of body text data. In this way, the page of body text data before tab paper undergoes a 1-sided print process, and that paper sheet is exhausted onto a tray without printing on its reverse face.

This embodiment will be described below using FIG. 19. In this embodiment, "Tab Paper" is selected for "Sheet for Insertion" 1501; "Both Sides" for "Print on" 1502; and the fourth and eighth pages for "Insertion Positions" 1504 of tab paper on the GUI shown in FIG. 15. Since "Both sides" is selected for "Print on", a 2-sided print command is issued in step 1905. For this reason, the second page of body text data is printed on the reverse face of the first page (step 1907). Subsequently, a command that designates a 1-sided print mode is issued in step 1908. This is to temporarily output a paper sheet on which body text data is printed to exhaust tray B since the fourth page corresponds to a print process on a tab paper sheet.

Next, PDL commands that designate attributes of tab paper are issued in steps 1910, 1911, and 1912, and image data of the fourth page as the obverse face of the tab paper sheet is generated. Then, PDL commands that designate attributes of body text data are issued in steps 1914, 1915, and 1916, and a 2-sided print command is issued in step 1917. For this reason, the sixth page of body text data is printed on the reverse face of the fifth page (step 1919). A command that designates a 1-sided print mode is issued in step 1920. This is to temporarily output a paper sheet on which body text data is printed to exhaust tray B since the eighth page corresponds to a print process on a tab paper sheet.

The obverse face of the eighth page of a tab paper sheet undergoes a print process in steps 1922, 1923, and 1924, and a PJL command that pauses the print process until an instruction comes from the user interface 22 of the printer is issued in step 1926. PDL commands that designate attributes of tab paper are issued in steps 1927, 1928, and 1929, and image data of the fourth and eighth pages as the reverse faces of the tab paper sheets are generated. Finally, a command that means Job End is output in step 1932, thus generating a file of the driver.

With the above process, even when body text data are to undergo a 2-sided print process, and body text data before tab paper forms an odd-numbered page, body text data and tab paper data can be separately printed, and unwanted billing at that time can be avoided.

Third Embodiment

In the first and second embodiments, body text data and tab obverse face data are printed at the same time, and tab reverse face data are then printed together. This embodiment will explain a case wherein tab reverse face data are printed first, and body text data and tab obverse face data are then printed.

In this embodiment, since tab paper sheets can undergo a print process while being inserted at designated page positions among body text pages, the need for inserting tab paper sheets into body text pages can be obviated, i.e., no user's action is required after the reverse face print process of tab paper sheets.

Figure 20:
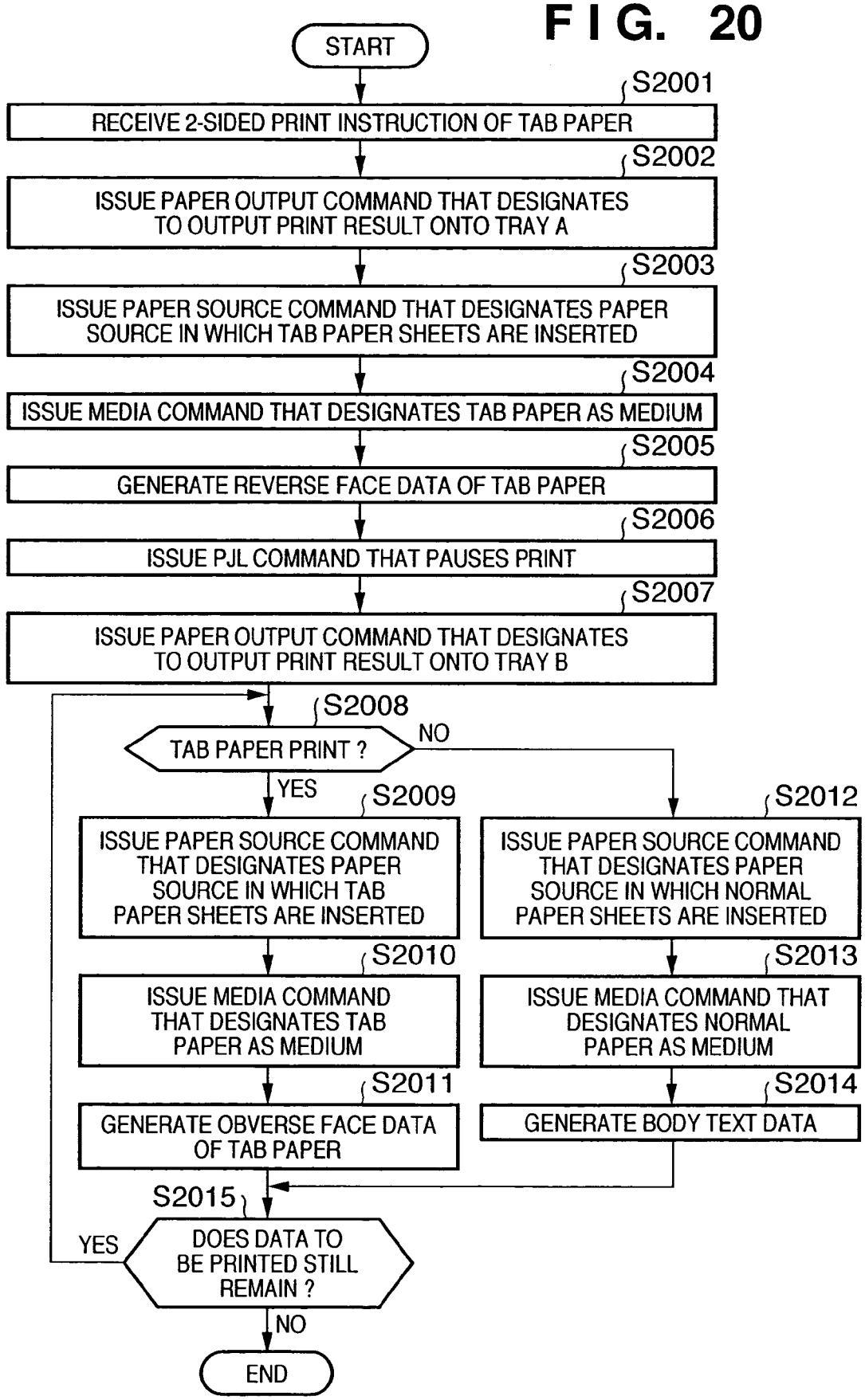
FIG. 20 is a flow chart showing the process on the host computer 3000 side in the print process according to the third embodiment of the present invention.
Figure 21:
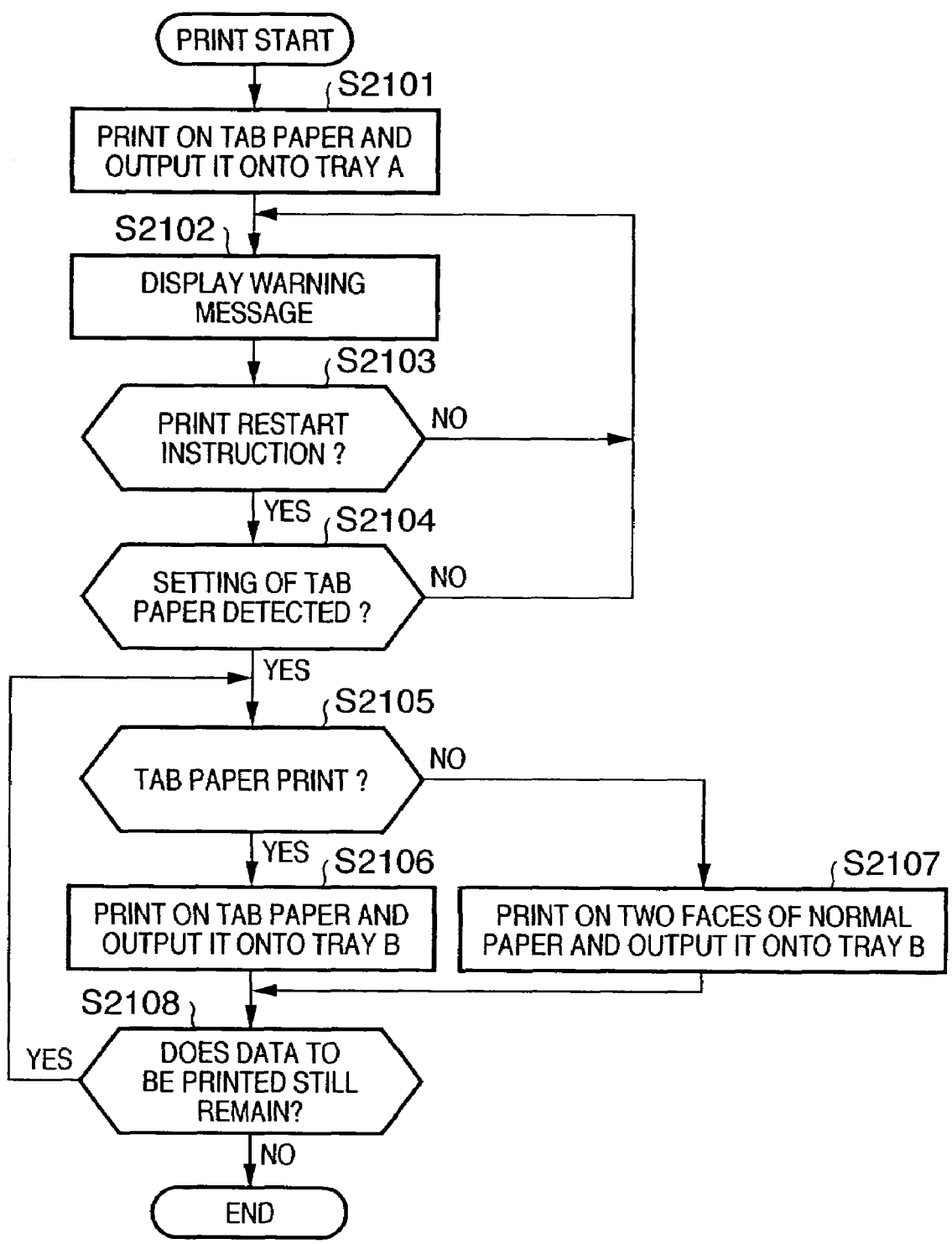
FIG. 21 is a flow chart showing the process on the printer 1500 side in the print process according to the third embodiment of the present invention.

This embodiment will be described in detail below using the flow charts of FIGS. 20 and 21. FIG. 20 is a flow chart showing the process of the printer driver 203 on the host computer 3000 side upon executing a 2-sided print process of tab paper sheets in this embodiment. FIG. 21 is a flow chart showing the process on the printer 1500 side upon executing a 2-sided print process of tab paper sheets in this embodiment.

In step 2001, a 2-sided print execution instruction of tab paper sheets is accepted from the user. The 2-sided print instruction is issued based on inputs on the aforementioned GUIs shown in FIGS. 15 and 16.

FIG. 15 shows an example of a GUI window used to make setups associated with tab paper sheets. In FIG. 15, "Tab Paper" is selected for "Sheet for Insertion" 1501; "Both Sides" for "Print on" 1502; "Drawer3" for "Paper Source" 1503 used to feed tab paper sheets in the sheet feed unit 23; the third and sixth pages for "Insertion Positions" 1504 of tab paper; and "Tray A" for "Paper Output" 1505 on which tab paper sheets, the reverse faces of which have been printed, are to be temporarily output. The reason why tray A is designated as the exhaust tray on which tab paper sheets are to be temporarily output is that only the print results of the reverse faces of tab paper sheets are output onto tray A since final outputs are made onto tray B as a combination of body text and tab paper pages.

FIG. 16 shows an example of a GUI window used to make setups associated with the print process of body text. In FIG. 16, "2-sided Printing" is selected for "Print Style" 1601; "Long Edge [Left]" for "Binding Location" 1602; "Collate" for "Finishing" 1603; and "Tray B" for "Paper Output" 1604 on which final outputs including body text pages are to be output.

Upon reception of the 2-sided print instruction in step 2001, a paper output command that designates to output a print result onto tray A is issued in step 2002. A paper source designation command that designates a paper source in which tab paper sheets are inserted, and a media command that designates tab paper as a medium are issued in steps 2003 and 2004, and reverse face data of tab paper sheets are generated in step 2005. A PJL command that pauses the print process temporarily until an instruction comes from the user interface 22 of the printer 1500 is issued in step 2006.

In step 2005, the reverse face data of tab paper sheets as the third and sixth pages are generated. However, the reverse face data of tab paper sheets are not created on the application 201. When the 2-sided print mode of tab paper sheets is designated on the user interface of the printer driver 203, the printer driver 203 internally generates images of the reverse faces of tab paper sheets. In this generation process, obverse face data of tab paper sheets as the third and sixth pages in the 1-sided print mode are saved as the images of reverse faces of tab paper sheets upon generating the spool file 303. However, these data cannot be directly used as reverse face data. Hence, images used upon printing obverse face data are converted into mirror images to generate images of reverse face tabs.

In step 2007, a paper output command that designates to output a print result to tray B is issued. This is to output both tab paper and body text pages onto tray B together since tray A is selected as the exhaust tray of tab paper sheets by setups corresponding to FIG. 15. After that, it is checked in step 2008 if a tab paper print process is to be made. In the example shown in FIG. 15, since the third and sixth pages are to undergo the tab paper print process, the first and second pages correspond to body text data. Hence, since it is determined in step 2008 that no tab paper print process is to be made, a paper source designation command that designates a paper source in which normal paper sheets are inserted, and a media command that designates normal paper as a medium are issued in steps 2012 and 2013, and body text data is generated in step 2014.

Upon starting the print process of the third page, since the determination result in step 2008 indicates a tab paper print process for the first time in the above example, the flow advances to step 2009. A paper source designation command that designates a paper source in which tab paper sheets are inserted, and a media command that designates tab paper as a medium are issued in steps 2009 and 2010, and obverse face data of a tab paper sheet is generated in step 2011. Upon completion of the generation process of the obverse face data of the tab paper sheet in step 2011, it is checked in step 2015 if data to be printed still remain. If all data have been processed, the print process ends. On the other hand, if data to be printed still remain, the flow returns to step 2008 to continue to the print process. In the flow of processes corresponding to the setup example shown in FIG. 15, after body text data of the fourth and fifth pages are printed, and obverse face data of a tab paper sheet as the sixth page is printed, the print process ends.

The print process flow on the printer 1500 side upon executing the 2-sided print process of tab paper sheets will be explained below using FIG. 21. In step 2101, a tab paper sheet is fed from Drawer3 that stores tab paper sheets, the print process of the reverse face data of tab paper sheets as the third and sixth pages is executed, and the tab paper sheets are output onto tray A. In step 2102, a warning message "remove tab paper sheets from tray A, and insert removed sheets into cassette (storage unit) again" is displayed on the display window of the user interface 22 of the printer 1500. If it is determined in step 2103 that the user has pressed a button that instructs to restart the print process (e.g., an OK button or an online button) on the user interface 22 of the printer 1500, the flow advances to step 2104 to check if the sensor 24 provided to the sheet feed unit 23 detects setting of tab paper sheets. If the sensor 24 cannot detect setting of tab paper sheets, the flow returns to step 2102 to display the message "remove tab paper sheets from tray A, and insert removed sheets in a cassette (storage unit) again" on the display window of the user interface 22 of the printer 1500 again.

If the sensor 24 can detect setting of tab paper sheets in step 2104, it is checked in step 2105 if a tab paper print process is to be made. In the example shown in FIG. 15, since the third and sixth pages are to undergo the tab paper print process, the first and second pages correspond to body text data. Hence, since it is determined in step 2105 that no tab paper print process is to be made, body text data of the first and second pages are printed on two faces of a normal paper sheet and the printed sheet is output onto tray B in step 2107.

Upon starting the print process of the third page, since the determination result in step 2105 indicates a tab paper print process for the first time in the above example, the flow advances to step 2106. In step 2106, a tab paper sheet is fed from Drawer3 that stores tab paper sheets, the print process of the obverse face data of tab paper sheet is executed, and the tab paper sheet is output onto tray B. Upon completion of the obverse face print process of the tab paper sheet in step 2106, it is checked in step 2108 if data to be printed still remain. If all data have been printed, the print process ends. On the other hand, if data to be printed still remain, the flow returns to step 2105 to continue the print process. In the flow of processes corresponding to the setup example shown in FIG. 15, after a normal paper sheet on which body text data of the fourth and fifth pages are printed is output onto tray B, and a tab paper sheet on which the obverse face data of a tab paper sheet as the sixth page is printed is output onto tray A, the print process ends.

With the above process, since the tab reverse face print process is executed first, and body text and tab obverse face print processes are then executed, the reverse face print process can be done by a single print job. Since tab paper sheets are inserted at desired positions upon output onto the tray, output documents can be directly filed.

Fourth Embodiment

In the first to third embodiments, the print process that includes those of both body text pages and tab paper pages has been explained. This embodiment will explain a case wherein only tab paper sheets are printed without being inserted among body text pages.

Figure 23:
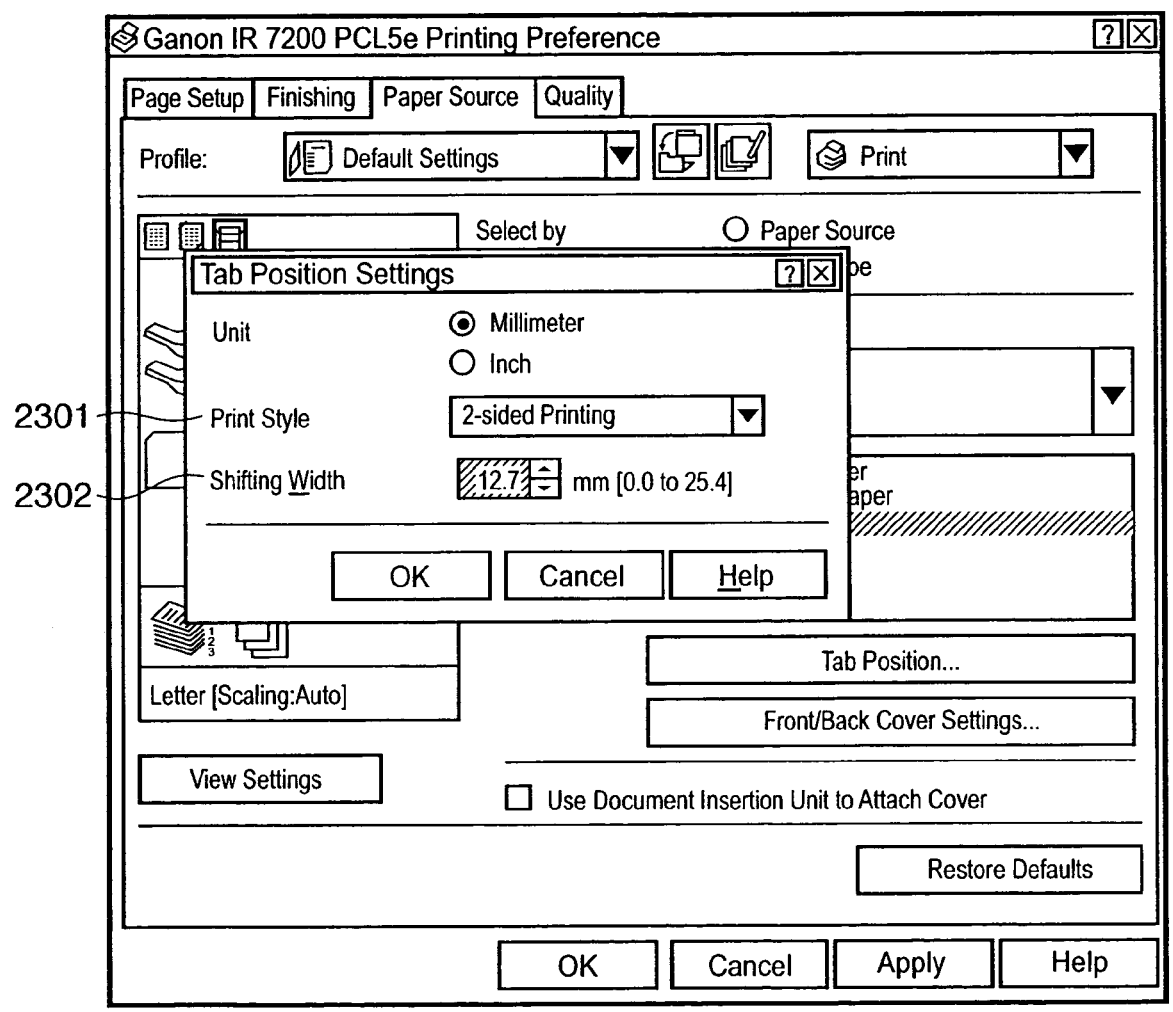
FIG. 23 shows an example of a user interface displayed upon executing a 2-sided print process of only tab paper sheets according to the fourth embodiment of the present invention.

FIG. 23 shows an example of a GUI displayed on the CRT display 10 of the host computer 3000 in this embodiment. Assume that 2-sided/1-sided Printing can be selected for "Print Style" 2301, and the shifting width of a tab paper sheet can be selected for "Shifting Width" 2302. In this embodiment, three pages of documents are to be printed on the two faces of tab paper sheets.

Upon reception of a 2-sided print instruction in step 2201, the print process starts, and the obverse faces of tab paper sheets undergo a print process in step 2202. In step 2203, the print results are output onto tray A.

Upon completion of the obverse face print process of tab paper sheets, the number of which has been set on the GUI of FIG. 23, the flow advances to step 2204, and a warning message, e.g., "remove tab paper sheets, obverse faces of which have been printed, from tray, and insert removed sheets into cassette again" is displayed on the display window of the user interface 22 of the printer 1500.

Since the user re-inserts the tab paper sheets, the obverse faces of which have been printed, into Drawer3 again in response to this message, the sensor 24 mounted on the sheet feed unit 23 detects setting of the tab paper sheets in step 2205. At this time, the user inserts the tab paper sheets, the obverse faces of which have been printed, into the cassette, so that the third page appears on top of these sheets. In step 2206, depression of a button that instructs to restart the print process (e.g., an OK button or an online button) by the user is accepted. In step 2207, the print process of the reverse faces of the tab paper sheets is executed. The print results are output onto tray B in step 2208.

Figure 22:
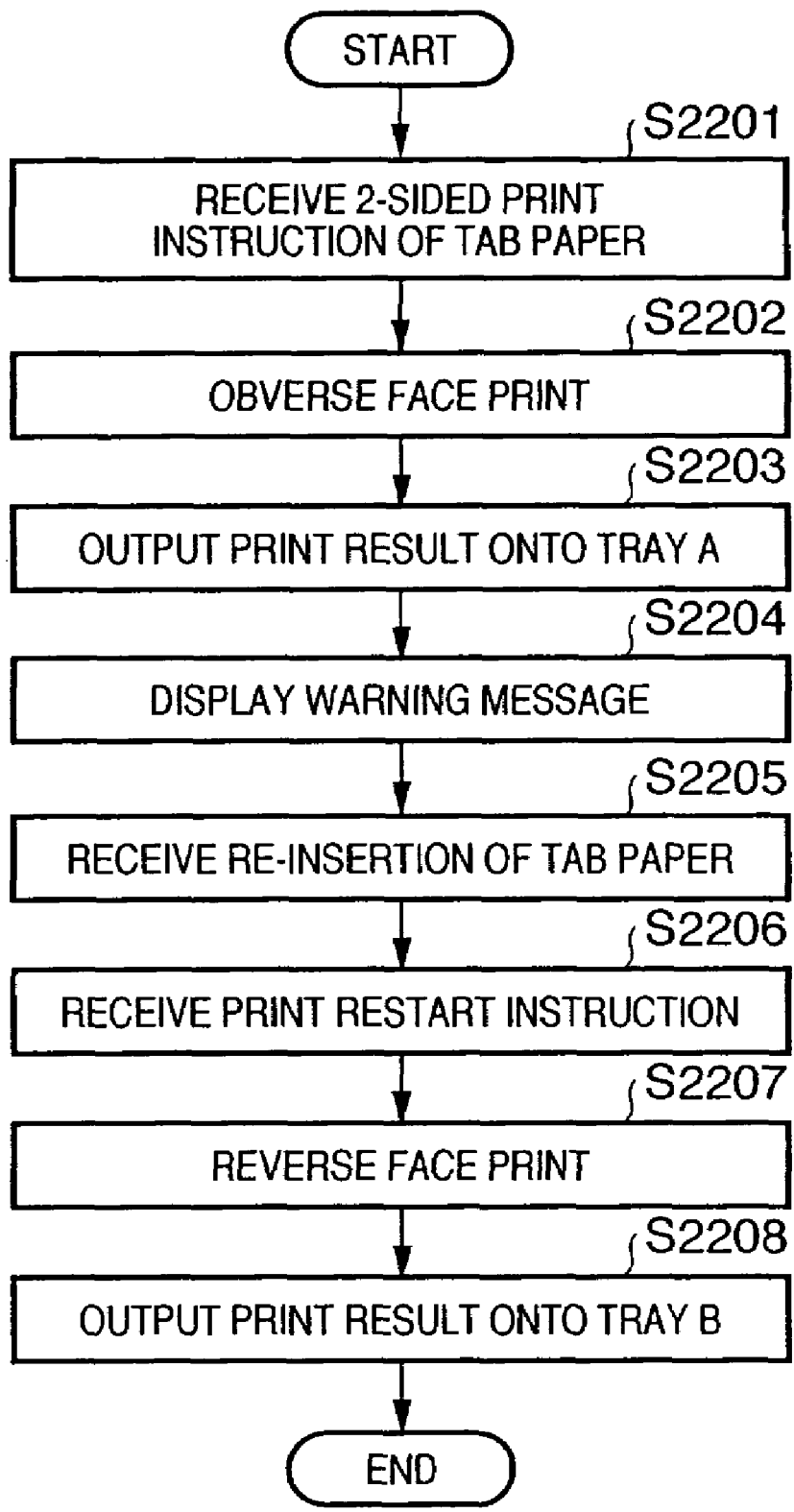
FIG. 22 is a flow chart showing the process executed when only tab paper sheets undergo a print process according to the fourth embodiment of the present invention.

A print job to be generated by the printer 203 to control the processing sequence in the tab paper print process corresponding to the flow chart in FIG. 22 will be described below using FIG. 24.

A Job Start command that means start of a job is issued in step 2401. After that, image data of the first page, second page, . . . are sent in turn. At this time, a command that designates an output tray is appended to the head of each page. In case of this embodiment, a command that means tray B is issued for the reverse faces of tabs of the third, second, and first pages, and a command that means tray A is issued upon printing the obverse faces of tabs of the first, second, and third pages. After the obverse face of the tab of the third page is printed, a warning message is displayed on the display window of the printer 1500 in step 2405, and a PJL command that pauses the print process until depression of an OK button or an online button from the user is accepted is issued. Hence, the print process is paused.

On the application 201, no images corresponding to the reverse faces of tab paper sheets are created. When the 2-sided print mode of tab paper sheets is designated on the user interface of the driver, the driver internally generates images of the reverse faces of tab paper sheets. In this generation process, obverse face data of tab paper sheets as the first to third pages in the 1-sided print mode are saved as the images of the reverse faces of tab paper sheets upon generating the spool file 303. However, these data cannot be directly used as reverse face data. Hence, images used upon printing obverse face data are converted into mirror images to generate images of reverse face tabs, and are printed in the order of the third, second, and first pages.

Finally, a command that means Job End is output in step 2409, thus generating a file of the driver.

With the above process, even when only tab paper sheets are to undergo a print process, the reverse face print process can be done by a single print job.

Other Embodiment

The present invention can be applied to a system constituted by a plurality of devices (e.g., host computer, interface, reader, printer) or to an apparatus comprising a single device (e.g., copying machine, facsimile machine)

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the described embodiments and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above described embodiments are realized by executing the program codes which are read by a computer, the present invention includes a case where an OS (operating system) or the like working on the computer performs a part or entire processes in accordance with designations of the program codes and realizes functions according to the above described embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above described embodiments.

In a case where the present invention is applied to the aforesaid storage medium, the storage medium stores program codes corresponding to the flowcharts described in the embodiments. The present invention is not limited to the above embodiments and various changes and modifications can be made within the spirit and scope of the present invention. Therefore to apprise the public of the scope of the present invention, the following claims are made. It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. An information processing apparatus, which is connected to a printing apparatus, and has a printer driver which issues control commands causing the printing apparatus to execute a 2 sided print processing of body text and tab data on print sheets and a tab print sheet, respectively, said information processing apparatus comprising:
   a setup reception unit configured to receive a print setup for the 2 sided print processing of the tab print sheet using a user interface of the printer driver;
   a first command issuance unit configured to issue a first control command which instructs to execute a 2 sided print processing of the body text data on the print sheets in accordance with the received 2 sided print setup for the tab print sheet;
   a second command issuance unit configured to issue a second control command which instructs to execute a print processing of a front side of the tab print sheet in accordance with the received 2 sided print setup for the tab print sheet;
   a pause command issuance unit configured to issue a command that pauses a print processing in the printing apparatus after the first and second control commands are issued; and
   a third command issuance unit configured to issue a third control command which instructs to execute a print processing of a back side of the tab print sheet in accordance with the received 2 sided print setup for the tab print sheet,
   wherein when the tab print sheet undergoes print processing while inserted among the print sheets, on which the body text data is printed in a 2 sided print mode, and the number of body text pages before the tab print sheet is odd, said first command issuance unit issues a blank page non-billing command that instructs to execute a non-billing blank page print process on a back side of the print sheet on which the body text data immediately before the tab print sheet is printed, and
   said printer driver stores tab data to be used for locating content to be printed on the tab on the front side of the tab print sheet, and uses the stored tab data in mirror image in case of printing that content on the tab on the back side of the tab print sheet.

2. The apparatus according to claim 1, wherein said setup reception unit comprises:
   a paper source setup unit configured to receive designation of a paper source of the tab print sheet;
   a print style setup unit configured to receive designation of a print style on the tab print sheet;
   an insertion position setup unit configured to receive an insertion position of the tab print sheet among body text pages; and
   an output setup unit configured to receive designation of an output unit that outputs a print result on the tab print sheet.

3. The apparatus according to claim 2, wherein said setup reception unit further comprises:
   a print style setup unit configured to receive designation of a print style of the body text data; and
   an output setup unit configured to receive designation of an output unit that outputs a print result of the body text data.

4. A method of controlling an information processing apparatus, which is connected to a printing apparatus, and has a printer driver which issues control commands causing the printing apparatus to execute a 2 sided print processing of body text and tab data on print sheets and a tab print sheet, respectively, said method comprising:
   a setup reception step of receiving a print setup for 2 sided print processing of the tab print sheet using a user interface of the printer driver;
   a first command issuance step of issuing a first control command which instructs to execute a 2 sided print processing of the body text data on the print sheets in accordance with the received 2 sided print setup for the tab print sheet;
   a second command issuance step of issuing a second control command which instructs to execute a print processing of a front side of the tab print sheet in accordance with the received 2 sided print setup for the tab print sheet;
   a pause command issuance step of issuing a command that pauses a print processing in the printing apparatus after the first and second control commands are issued; and
   a third command issuance step of issuing a third control command which instructs to execute a print processing of a back side of the tab print sheet in accordance with the received 2 sided print setup for the tab print sheet,
   wherein when the tab print sheet undergoes a print processing while inserted among the print sheets, on which the body text data is printed in a 2 sided print mode, and the number of body text pages before the tab print sheet is odd, said first command issuance step includes a step of issuing a blank page non-billing command that instructs to execute a non-billing blank page print process on a back side of the print sheet on which the body text data immediately before the tab print sheet is printed, and
   said printer driver stores tab data to be used for locating content to be printed on the tab on the front side of the tab print sheet, and uses the stored tab data in mirror image in case of printing that content on the tab on the back side of the tab print sheet.

5. The method according to claim 4, wherein the setup reception step comprises:
   a paper source setup step of receiving designation of a paper source of the tab print sheet;
   a print style setup step of receiving designation of a print style on the tab print sheet;
   an insertion position setup step of receiving an insertion position of the tab print sheet among body text pages; and
   an output setup step of receiving designation of an output unit that outputs a print result on the tab print sheet.

6. The method according to claim 5, wherein the setup reception step further comprises:
   a print style setup step of receiving designation of a print style of the body text data; and
   an output setup step of receiving designation of an output unit that outputs a print result of the body text data.

7. A computer-readable medium encoded with computer executable instructions for making a computer execute a method of claim 4.

* * * * *